US012443800B2

(12) United States Patent
Stremmel et al.

(10) Patent No.: US 12,443,800 B2
(45) Date of Patent: Oct. 14, 2025

(54) GENERATION OF SYNTHETIC QUESTION-ANSWER PAIRS USING A DOCUMENT CLASSIFIER AND CLASSIFICATION EXPLAINER

(71) Applicant: UnitedHealth Group Incorporated, Minnetonka, MN (US)

(72) Inventors: Joel David Stremmel, Iowa City, IA (US); Eran Halperin, Santa Monica, CA (US); Sanjit S Batra, Redwood City, CA (US); Ardavan Saeedi, Jersey City, NJ (US); Hamid Reza Hassanzadeh, Suwanee, GA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 343 days.

(21) Appl. No.: 18/315,112

(22) Filed: May 10, 2023

(65) Prior Publication Data

US 2024/0256782 A1 Aug. 1, 2024

Related U.S. Application Data

(60) Provisional application No. 63/482,615, filed on Feb. 1, 2023.

(51) Int. Cl.
*G06F 40/30* (2020.01)
*G06N 5/022* (2023.01)

(52) U.S. Cl.
CPC .............. *G06F 40/30* (2020.01); *G06N 5/022* (2013.01)

(58) Field of Classification Search
CPC ................................. G06F 40/30; G06N 5/022
See application file for complete search history.

(56) References Cited

U.S. PATENT DOCUMENTS

| 10,372,819 B2 | 8/2019 | Bufe et al. |
| 11,163,947 B2 | 11/2021 | Mezaoui et al. |
| 2015/0262070 A1* | 9/2015 | Aharoni ................. G16H 50/20 706/12 |

(Continued)

FOREIGN PATENT DOCUMENTS

| CN | 113672708 A | 5/2020 |
| WO | 2021/150313 A1 | 7/2021 |

OTHER PUBLICATIONS

Aithal, Shivani G. et al. "Automatic Question-Answer Pairs Generation and Question Similarity Mechanism in Question Answering System," Applied Intelligence, vol. 51, pp. 8484-8497, Apr. 7, 2021, available online: https://link.springer.com/article/10.1007/s10489-021-02348-9.

(Continued)

*Primary Examiner* — Eric Yen
(74) *Attorney, Agent, or Firm* — ALSTON & BIRD LLP

(57) ABSTRACT

Various embodiments of the present disclosure provide methods, apparatus, systems, computing devices, computing entities, and/or the like for improving question-answer (QA) machine learning model training based on generating predicted label indicators, generating prediction score indicators and prediction explanation indicators, generating structured label-explanation datasets, generating synthetic QA training datasets, generating a prediction output, and initiating the performance of one or more prediction-based operations based on the prediction output.

20 Claims, 14 Drawing Sheets

(56) References Cited

U.S. PATENT DOCUMENTS

| | | | |
|---|---|---|---|
| 2017/0308790 A1* | 10/2017 | Nogueira dos Santos | ................... G06N 3/045 |
| 2021/0012897 A1* | 1/2021 | Katuwal | ................ G06N 20/00 |
| 2021/0034813 A1 | 2/2021 | Wu et al. | |
| 2022/0076081 A1* | 3/2022 | Jeong | .................... G06F 18/214 |
| 2022/0147718 A1* | 5/2022 | Kim | ......................... G06N 5/04 |
| 2022/0318230 A1 | 10/2022 | Sikka et al. | |
| 2024/0256906 A1* | 8/2024 | Yadav | ...................... G06N 5/02 |
| 2025/0156644 A1* | 5/2025 | Neerukonda | ........... G06F 40/35 |

OTHER PUBLICATIONS

Alberti, Chris et al. "Synthetic QA Corpora Generation With Roundtrip Consistency," arXiv:1906.05416v1 [cs.CL]. Jun. 12, 2019, (7 pages), available online: https://arxiv.org/abs/1906.05416.

Huang, Kexin et al. "ClinicalBERT: Modeling Clinical Notes and Predicting Hospital Readmission," arXiv: 1904.05342v3 [cs.CL], Nov. 29, 2020, (9 pages), available online: https://arxiv.org/abs/1904.05342.

Lehman, Eric et al. "Learning To Ask Like A Physician," arXiv: 2206.02696v1 [cs.CL], Jun. 6, 2022, (13 pages), available online: https://arxiv.org/abs/2206.02696.

Li, Yikuan et al. "Clinical-Longformer and Clinical-BigBird: Transformers For Long Clinical Sequences," arXiv: 2201.11838v3 [cs.CL] Apr. 15, 2022, (9 pages), available online: https://arxiv.org/abs/2201.11838.

Pampari, Ansuri et al. "emrQA: A Large Corpus For Question Answering On Electronic Medical Records," arXiv: 1809.00732v1 [cs.CL], Sep. 3, 2018, available online: https://arxiv.org/abs/1809.00732.

Reimers, Nils et al. Sentence-BERT: Sentence Embeddings Using Siamese BERT-Networks, arXiv: 1908.10084v1 [cs.CL], Aug. 27, 2019, (11 pages), https://arxiv.org/abs/1908.10084.

Shen, Sheng et al. "On The Generation Of Medical Question-Answer Pairs," arXiv: 1811.0068v2, Dec. 6, 2019, (10 pages), https://arxiv.org/abs/1811.00681.

Tu, Ming et al. "Select, Answer and Explain: Interpretable Multi-Hop Reading Comprehension Over Multiple Documents," In Proceedings Of The Thirty-Fourth AAAIA Conference On Artificial Intelligence (AAAI-20), vol. 34, No. 5, pp. 9073-9080, Apr. 3, 2020.

Wood-Doughty, Zach et al. "Model Distillation For Faithful Explanations Of Medical Code Predictions," In Proceedings of the 21st Workshop On Biomedical Language Processing, pp. 412-425, May 26, 2022.

Yue, Xiang et al. "Clinical Reading Comprehension: A Thorough Analysis of the emrQA Dataset," arXiv: 2005.00574v1 [cs.CL], May 1, 2020, (13 pages), available online: https://arxiv.org/abs/2005.00574.

Yue, Xiang et al. "CliniQG4QA: Generating Diverse Questions For Domain Adaptation Of Clinical Question Answering," arXiv: 2010.16021v3 [cs.CL], Dec. 11, 2021, (8 pages), available online: https://arxiv.org/abs/2010.16021.

* cited by examiner

| PREDICTED LABEL INDICATOR 802A | PREDICTED LABEL INDICATOR 802B | PREDICTED LABEL INDICATOR 802C | ... |
|---|---|---|---|
| PREDICTION EXPLANATION INDICATOR 804A | PREDICTION SCORE INDICATOR 806A | PREDICTION SCORE INDICATOR 806B | PREDICTION SCORE INDICATOR 806C | ... |
| PREDICTION EXPLANATION INDICATOR 804B | PREDICTION SCORE INDICATOR 806D | PREDICTION SCORE INDICATOR 806E | PREDICTION SCORE INDICATOR 806F | ... |
| PREDICTION EXPLANATION INDICATOR 804C | PREDICTION SCORE INDICATOR 806G | PREDICTION SCORE INDICATOR 806H | PREDICTION SCORE INDICATOR 806I | ... |
| PREDICTION EXPLANATION INDICATOR 804D | PREDICTION SCORE INDICATOR 806J | PREDICTION SCORE INDICATOR 806K | PREDICTION SCORE INDICATOR 806L | ... |
| ... | ... | ... | ... | ... |

FIG. 8

GENERATION OF SYNTHETIC QUESTION-ANSWER PAIRS USING A DOCUMENT CLASSIFIER AND CLASSIFICATION EXPLAINER

CROSS-REFERENCE TO RELATED APPLICATIONS

This application claims priority to and the benefit of U.S. Provisional Application No. 63/482,615, titled "GENERATION OF SYNTHETIC QUESTION-ANSWER PAIRS USING A DOCUMENT CLASSIFIER AND CLASSIFICATION EXPLAINER" and filed Feb. 1, 2023, the entire content of which is incorporated herein by reference in its entirety.

BACKGROUND

A machine learning model refers to a computer software program that may analyze data and generate predictions. Many machine learning models are plagued with technical challenges and difficulties such as, low accuracy and low recall in generating predictions.

BRIEF SUMMARY

In general, various embodiments of the present disclosure provide methods, apparatus, systems, computing devices, computing entities, and/or the like for addressing technical challenges and difficulties related to, for example, but not limited to, training question-answer (QA) machine learning models. For example, various embodiments of the present disclosure provide technical benefits and advantages such as, but not limited to, improving accuracy and reliability of machine learning models in generating predictions based on generating synthetic QA training datasets and training the QA machine learning models based on the synthetic QA training datasets.

In some embodiments, a computer-implemented method comprises: generating, by one or more processors, one or more predicted label indicators associated with a textual dataset based on inputting the textual dataset to a dataset classification predicting machine learning model; generating, by the one or more processors, one or more prediction score indicators associated with one or more prediction explanation indicators based on inputting the textual dataset and the one or more predicted label indicators to a classification explanation predicting machine learning model; generating, by the one or more processors, one or more structured label-explanation datasets based on the one or more predicted label indicators, the one or more prediction explanation indicators, and the one or more prediction score indicators; generating, by the one or more processors, one or more synthetic QA training datasets based on the one or more structured label-explanation datasets and a prediction score threshold; generating, by the one or more processors, a prediction output using one or more QA machine learning models that are trained based on the synthetic QA training datasets; and initiating, by the one or more processors, the performance of one or more prediction-based operations based on the prediction output.

In some embodiments, a computing apparatus comprising memory and one or more processors communicatively coupled to the memory, the one or more processors configured to: generate one or more predicted label indicators associated with a textual dataset based on inputting the textual dataset to a dataset classification predicting machine learning model; generate one or more prediction score indicators associated with one or more prediction explanation indicators based on inputting the textual dataset and the one or more predicted label indicators to a classification explanation predicting machine learning model; generate one or more structured label-explanation datasets based on the one or more predicted label indicators, the one or more prediction explanation indicators, and the one or more prediction score indicators; generate one or more synthetic QA training datasets based on the one or more structured label-explanation datasets and a prediction score threshold; generate a prediction output using one or more QA machine learning models that are trained based on the synthetic QA training datasets; and initiate the performance of one or more prediction-based operations based on the prediction output.

In some embodiments, one or more non-transitory computer-readable storage media including instructions that, when executed by one or more processors, cause the one or more processors to: generate one or more predicted label indicators associated with a textual dataset based on inputting the textual dataset to a dataset classification predicting machine learning model; generate one or more prediction score indicators associated with one or more prediction explanation indicators based on inputting the textual dataset and the one or more predicted label indicators to a classification explanation predicting machine learning model; generate one or more structured label-explanation datasets based on the one or more predicted label indicators, the one or more prediction explanation indicators, and the one or more prediction score indicators; generate one or more synthetic QA training datasets based on the one or more structured label-explanation datasets and a prediction score threshold; generate a prediction output using one or more QA machine learning models that are trained based on the synthetic QA training datasets; and initiate the performance of one or more prediction-based operations based on the prediction output.

BRIEF DESCRIPTION OF THE DRAWINGS

FIG. 8 illustrates an example structured label-explanation dataset in accordance with some embodiments discussed herein.

DETAILED DESCRIPTION

Figure 1:
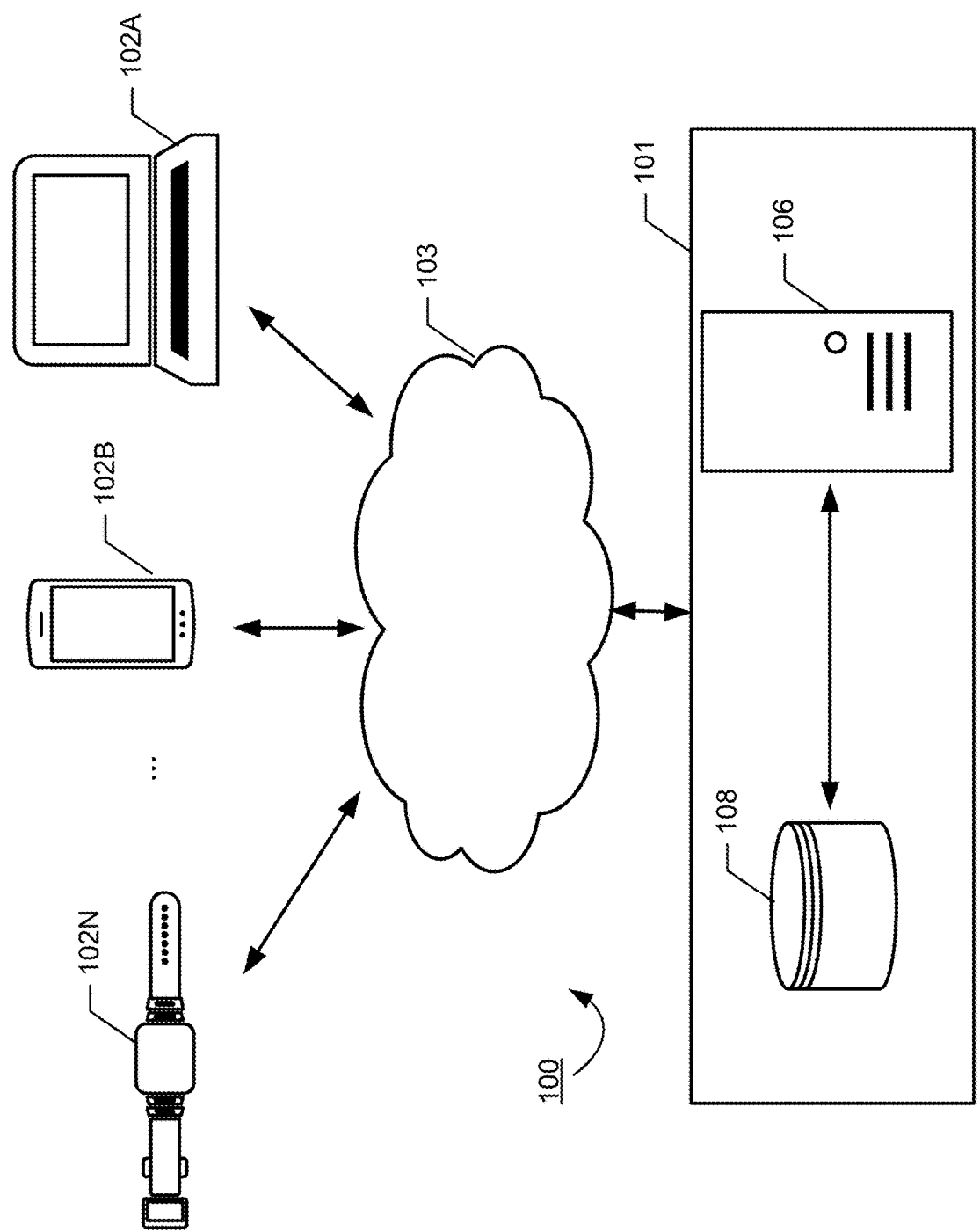
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on," "based at least on," "based at least in part on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

Referring now to FIG. 1, a schematic diagram of an example architecture 100 for training QA machine learning models is illustrated. In the example shown in FIG. 1, the example architecture 100 comprises a QA machine learning model platform/system 101 that may receive answer indicator prediction requests from other computing entities (such as, but not limited to, the client computing entity 102A, the client computing entity 102B, . . . , the client computing entity 102N). In some embodiments, the answer indicator prediction requests may comprise one or more queries or questions and indicate user requests for predicting answers to these queries or questions.

In some embodiments, the QA machine learning model platform/system 101 may process the answer indicator prediction requests to generate one or more predictions (such as, but not limited to, one or more predicted answer indicators), and automatically perform or initiate the performance of one or more prediction-based operations based on the generated predictions. In some embodiments, the QA machine learning model platform/system 101 may transmit the generated predictions to the other computing entities (such as, but not limited to, the client computing entity 102A, the client computing entity 102B, . . . , the client computing entity 102N).

In some embodiments, the QA machine learning model platform/system 101 communicates with at least one of the client computing entities (such as, but not limited to, the client computing entity 102A, the client computing entity 102B, . . . , the client computing entity 102N) through one or more communication channels using one or more communication networks such as, but not limited to, the networks 103. In some embodiments, the networks 103 may include, but not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. In some embodiments, the networks 103 may have any suitable communication range associated therewith and may include, for example, global networks (e.g., the Internet), MANs, WANs, LANs, or PANs. In some embodiments, the networks 103 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities. In some embodiments, the networks 103 may utilize a variety of networking protocols including, but not limited to, TCP/IP based networking protocols. In some embodiments, the protocol may be a custom protocol of JavaScript Object Notation (JSON) objects sent via a WebSocket channel. In some embodiments, the protocol is JSON over RPC, JSON over REST/HTTP, and/or the like.

In the example shown in FIG. 1, the QA machine learning model platform/system 101 includes a QA machine learning model computing entity 106 and a training dataset storage entity 108. Similar to those described above, the QA machine learning model computing entity 106 may receive one or more answer indicator prediction requests from other computing entities (such as, but not limited to, one or more of the client computing entity 102A, the client computing entity 102B, . . . , the client computing entity 102N). Similar to those described above, the one or more answer indicator prediction requests comprise electronic requests to predict one or more answer indicators. In some embodiments, the QA machine learning model computing entity 106 may process the one or more answer indicator prediction requests to generate predictions that include, but are not limited to, predicted answer indicators, and automatically perform or initiate the performance of one or more prediction-based operations based on the generated predictions that include, but are not limited to, the predicted answer indicators. In some embodiments, the QA machine learning model computing entity 106 transmits the generated predictions (such as, but not limited to, the predicted answer indicators) to other computing entities (such as, but not limited to, one or more of the client computing entity 102A, the client computing entity 102B, . . . , the client computing entity 102N).

In some embodiments, one or more machine learning models are deployed by the QA machine learning model platform/system 101 to generate predictions in response to answer indicator prediction requests from other computing entities (such as, but not limited to, one or more of the client computing entity 102A, the client computing entity 102B, . . . , the client computing entity 102N). For example, the QA machine learning model computing entity 106 of the QA machine learning model platform/system 101 may deploy one or more machine learning models to predict one or more answer indicators in response to one or more answer indicator prediction requests. In some embodiments, the QA machine learning model platform/system 101 and/or the QA machine learning model computing entity 106 may automatically perform or initiate the performance of one or more prediction-based operations based on training one or more machine learning models.

In the present disclosure, training an example machine learning model refers to an example process of inputting one or more training datasets to the example machine learning model and causing adjustments of one or more parameters associated with the machine learning model. In some embodiments, the example process of training an example machine learning model generates a trained machine learning model that can be validated, tested, and deployed. In some embodiments, training the example machine learning model may provide various technical benefits and advantages such as, but not limited to, identifying optimized values associated with the machine learning model parameters for improving accuracy and precision in generating predictions. As such, training machine learning models in accordance with some embodiments of the present disclosure may improve accuracy and precision of the predictions generated by machine learning models, and may further improve the performance of the prediction-based operations.

In some embodiments, the training dataset storage entity 108 stores QA training datasets that are used by the QA machine learning model computing entity 106 for training the one or more machine learning models. In some embodiments, the training dataset storage entity 108 may include one or more storage units, such as multiple distributed storage units that are connected through a computer network. In some embodiments, each storage unit in the training dataset storage entity 108 may store at least one of one or more data assets associated with the QA training datasets and/or one or more data about the computed properties of the one or more data assets. In some embodiments, each storage unit in the training dataset storage entity 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Example QA Machine Learning Model Computing Entity

Figure 2:
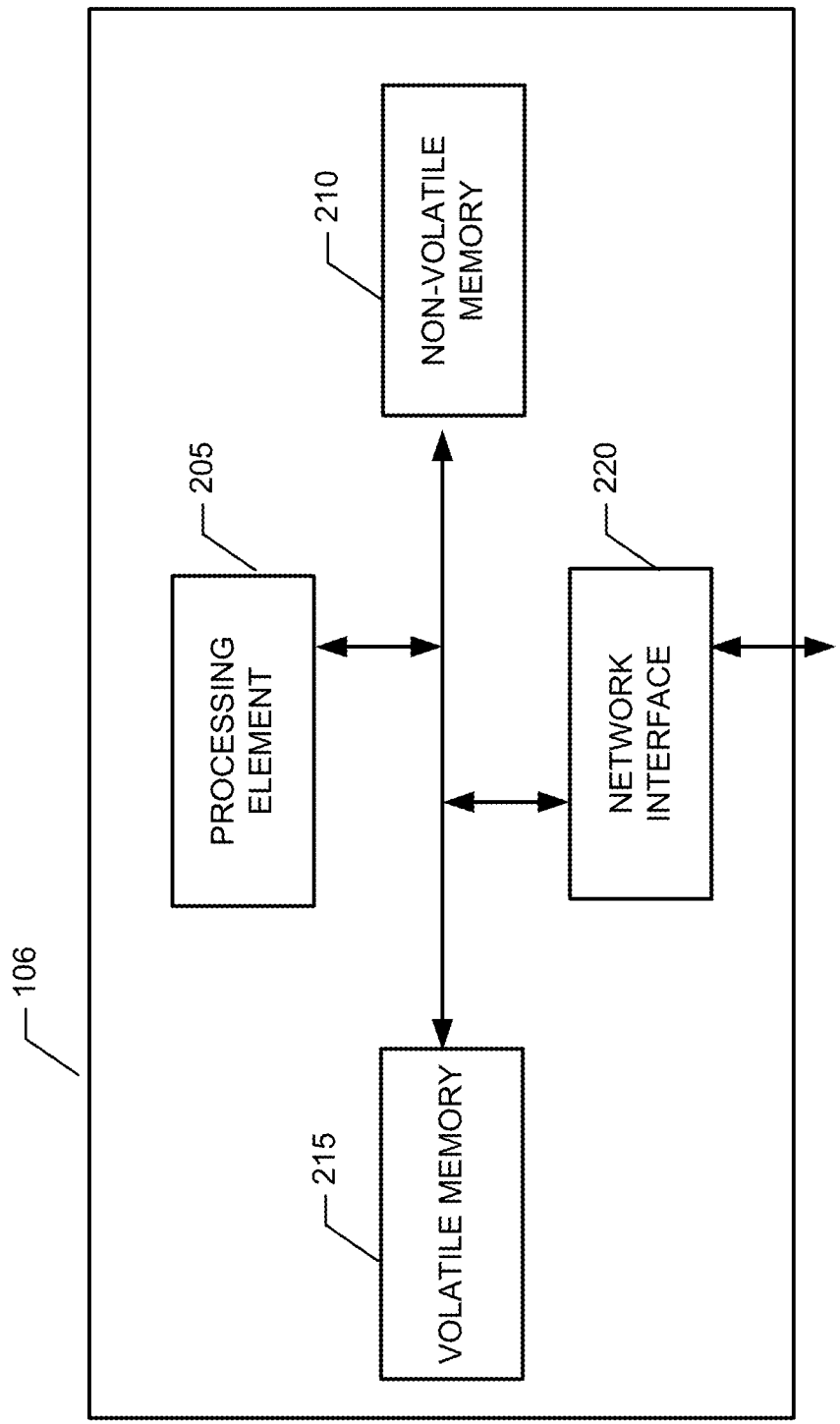
FIG. 2 provides an example QA machine learning model computing entity in accordance with some embodiments of the present disclosure.

Referring now to FIG. 2, an illustrative schematic of an example QA machine learning model computing entity 106 according to some embodiments of the present disclosure is illustrated.

In general, the terms computing entity, computer, entity, device, system, and/or similar words used herein interchangeably refers to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating, generating, monitoring, evaluating, comparing, and/or similar terms used herein interchangeably. In some embodiments, these functions, operations, and/or processes can be performed on data, content, information, and/or similar terms used herein interchangeably.

In some embodiments, the QA machine learning model computing entity 106 comprises, or is in communication with, one or more processing elements 205 (also referred to as processors, processing circuitry, and/or similar terms used herein interchangeably) that communicate with other elements within the QA machine learning model computing entity 106 (for example, via a bus), as shown in the example illustrated in FIG. 2. In some embodiments, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Additionally, or alternatively, the processing element 205 may be embodied as one or more other processing devices or circuitry. In the present disclosure, the term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. In some embodiments, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the QA machine learning model computing entity 106 comprises, or is in communication with, non-volatile media (also referred to as non-volatile storage, memory, memory storage, memory circuitry and/or similar terms used herein interchangeably), as shown in the example illustrated in FIG. 2. In some embodiments, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In some embodiments, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the QA machine learning model computing entity 106 comprises, or is in communication with, volatile media (also referred to as volatile storage, memory, memory storage, memory circuitry and/or similar terms used herein interchangeably), as shown in the example illustrated in FIG. 2. In some embodiments, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. In some embodiments, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the QA machine learning model computing entity 106 with the assistance of the processing element 205 and operating system.

In some embodiments, the QA machine learning model computing entity 106 includes one or more network interfaces 220 for communicating with various computing entities, such as by communicating data, content, information, and/or similar terms used herein interchangeably that can be transmitted, received, operated on, processed, displayed, stored, and/or the like, as shown in the example illustrated in FIG. 2. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the QA machine learning model computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

While the description above provides example elements of an example QA machine learning model computing entity, it is noted that the scope of the present disclosure is not limited to the description above. In some examples, an example QA machine learning model computing entity 106 may comprise one or more additional and/or alternative elements. For example, the QA machine learning model computing entity 106 may include, or be in communication with, one or more input elements, such as a keyboard input, a mouse input, a touch screen/display input, a motion input, a movement input, an audio input, a pointing device input, a joystick input, a keypad input, and/or the like. Additionally, or alternatively, the QA machine learning model computing entity 106 may include, or be in communication with, one or more output elements (not shown), such as an audio output, a video output, a screen/display output, a motion output, a movement output, and/or the like. Additionally, or alternatively, the QA machine learning model computing entity 106 may include, or be in communication with, one or more other elements.

B. Example Client Computing Entity

Figure 3:
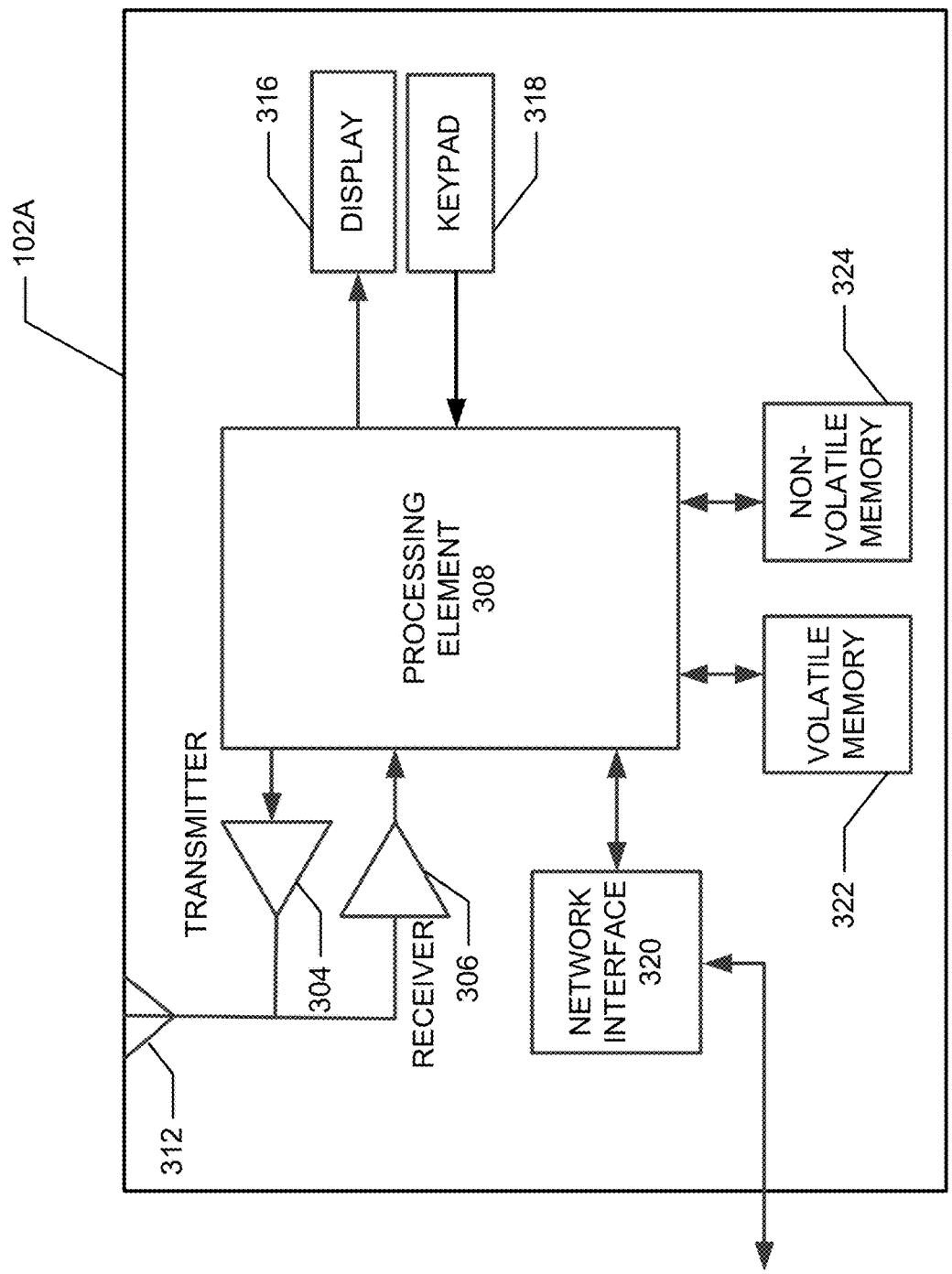
FIG. 3 provides an example client computing entity in accordance with some embodiments of the present disclosure.

Referring now to FIG. 3, an illustrative schematic representative of an example client computing entity 102A that can be used in conjunction with embodiments of the present disclosure is illustrated. In some embodiments, client computing entities (such as, but not limited to, the client computing entity 102A, the client computing entity 102B, . . . , the client computing entity 102N) can be operated by various parties.

In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

In some embodiments, the client computing entity 102A comprises an antenna 312, a transmitter 304 (e.g., radio), a receiver 306 (e.g., radio), and a processing element 308, as shown in the example illustrated in FIG. 3. In some embodiments, the processing element 308 may provide signals to and receives signals from the transmitter 304 and receiver 306, correspondingly. In some embodiments, examples of the processing element 308 may include, but are not limited to, CPLDs, microprocessors, multi-core processors, co-processing entities, ASIPs, microcontrollers, and/or controllers.

In some embodiments, the signals provided to and received from the transmitter 304 and the receiver 306, correspondingly, include signaling information/data in accordance with air interface standards of applicable wireless systems. In some embodiments, the client computing entity 102A may be capable of operating with one or more air interface standards, communication protocols, modulation types, and access types. In some embodiments, the client computing entity 102A may operate in accordance with any of a number of wireless communication standards and protocols associated with one or more other computing entities, such as those described above with regard to the QA machine learning model computing entity 106. In some embodiments, the client computing entity 102A may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. In some embodiments, the client computing entity 102A may operate in accordance with multiple wired communication standards and protocols associated with one or more other computing entities (such as those described above with regard to the QA machine learning model computing entity 106) via a network interface 320.

In some embodiments, via these communication standards and protocols, the client computing entity 102A communicates with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In some embodiments, the client computing entity 102A may download changes, add-ons, and updates, for instance, to its firmware, software (e.g., including executable instructions, applications, program modules), and operating system.

In some embodiments, the client computing entity 102A may include location determining aspects, devices, modules, functionalities, and/or similar words used herein interchangeably. In some embodiments, the client computing entity 102A may include outdoor positioning aspects, such as a location module adapted to acquire, for example, latitude, longitude, altitude, geocode, course, direction, heading, speed, universal time (UTC), date, and/or various other information/data. In some embodiments, the location module can acquire data, sometimes known as ephemeris data, by identifying the number of satellites in view and the relative positions of those satellites (e.g., using global positioning systems (GPS)). In some embodiments, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. In some embodiments, this data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Additionally, or alternatively, the location information/data can be determined by triangulating the position of the client computing entity 102A in connection with a variety of other systems, including cellular towers, Wi-Fi access points, and/or the like. In some embodiments, the client computing entity 102A may include indoor positioning aspects, such as a location module adapted to acquire, for example, latitude, longitude, altitude, geocode, course, direction, heading, speed, time, date, and/or various other information/data. In some embodiments, some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In some embodiments, the client computing entity 102A comprises a user interface (that can include a display 316 coupled to a processing element 308) and/or a user input interface (coupled to a processing element 308), as shown in the example illustrated in FIG. 3. In some embodiments, the user interface may be a user application, browser, user interface, and/or similar words used herein interchangeably executing on and/or accessible via the client computing entity 102A to interact with and/or cause display of information/data from the QA machine learning model computing entity 106, as described herein. In some embodiments, the user input interface may comprise any of a number of devices or interfaces allowing the client computing entity 102A to receive data, such as a keypad 318 (hard or soft), a touch display, voice/speech or motion interfaces, or other input devices. In embodiments including a keypad 318, the keypad 318 may include (or cause display of) the conventional numeric (0-9) and related keys (#, *), and other keys used for operating the client computing entity 102A and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In some embodiments, the client computing entity 102A may include volatile memory 322 and/or non-volatile memory 324, which can be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. In some embodiments, the volatile and non-volatile memory may store databases, database instances, database management systems, data, applications, programs, program modules, scripts, source code, object code, byte code, compiled code, interpreted code, machine code, executable instructions, and/or the like to implement the functions of the client computing entity 102A. In some embodiments, this may include a user application that is resident on the entity or accessible through a browser or other user interface for communicating with the QA machine learning model computing entity 106 and/or one or more other computing entities.

In another embodiment, the client computing entity 102A may include one or more components or functionality that are the same or similar to those of the QA machine learning model computing entity 106 as described in greater detail above. As will be recognized, these architectures and descriptions are provided for example purposes only and are not limited to the various embodiments.

In various embodiments, the client computing entity 102A may be embodied as an artificial intelligence (AI) computing entity, such as an Amazon® Echo, Amazon® Echo Dot, Amazon® Show, Google® Home, Apple® HomePod, and/or the like. Accordingly, the client computing entity 102A may be configured to provide and/or receive information/data from a user via an input/output mechanism such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the terms "dataset" and "document" refer to a collection of data and/or information (such as, but not limited to, structured data points, unstructured data points, and/or the like). In some embodiments, a dataset may be in the form of one or more regions in one or more data storage devices (such as, but not limited to, a computer-readable storage medium) that comprise and/or are associated with one or more parameters (such as, but not limited to, identifiers, metadata, and/or the like).

In some embodiments, an example dataset comprises various types of data and/or information such as, but not limited to, textual data, image data, and/or the like. In some embodiments, the term "textual dataset" refers to a type of dataset that is a collection or a unit of textual data points such as, but not limited to, texts, letters, characters, numbers, and/or the like. In some embodiments, example textual data points of an example textual dataset may be arranged or organized into one or more formats such as, but not limited to, sentences, paragraphs, documents, and/or the like.

In some embodiments, textual data points of textual datasets may be expressed in a structured format as "tokens" for the purpose of natural language processing. In such examples, textual datasets are transformed from raw text into tokens through tokenization so that the textual dataset is suitable as inputs for machine learning models (including, but not limited to, various example QA machine learning models described herein). Additionally, or alternatively, textual data points of textual datasets may be expressed as "vectors," which represent data and/or information from the textual data points as numerical values. Additionally, or alternatively, textual data points of textual datasets may be expressed in other formats.

In some embodiments, an example textual dataset may comprise various data and/or information. As an example in the context of healthcare, an example textual dataset may comprise or be in the form of an electronic health record (EHR) of one or more users (such as, but not limited to, one or more patients). In such an example, the example textual dataset may comprise data and/or information such as, but not limited to, demographic information associated with the users (such as, but not limited to, a patient's name, gender, age, and/or the like), test results associated with the users (such as, but not limited to, blood tests, imaging studies, and/or the like), medical history associated with the users (such as, but not limited to, past illness, surgeries, medications, and/or the like), notes taken by providers during users' visits, and/or the like.

While the description above provides an example textual dataset in the context of healthcare, it is noted that the scope of the present disclosure is not limited to the description above. In some examples, an example textual dataset may comprise additional and/or alternative data and/or information.

While various examples of the present disclosure are described in connection with textual datasets, it is noted that the scope of the present disclosure is not limited to textual datasets. In some examples, various examples of the present disclosure may be implemented in connection with other types of dataset such as, but not limited to, graphical datasets.

In some embodiments, the terms "label indicator" and "document label" refer to a data point that represents, indicates, stores and/or comprises one or more labels, tags, categories, classifications, characterizations, and/or the like. In some embodiments, an example label indicator may comprise a single value such as, but not limited to, a numerical value, a text string, and/or the like. In some embodiments, an example label indicator may comprise multiple values such as, but not limited to, various combinations of one or more numerical values and/or one or more text strings.

In accordance with various embodiments of the present disclosure, various types of label indicators may be implemented.

For example, an example label indicator may represent, indicate, store and/or comprise an example binary classification label indicator. In some embodiments, the term "binary classification label indicator" refers to a type of label indicator that labels, tags, categorizes, classifies, and characterizes data into one of two distinct classes or categories (for example, but not limited to, a positive class and a negative class). Continuing from the healthcare example above, an example binary classification label indicator may indicate either "diabetic" (e.g., a positive class) or "non-diabetic" (e.g., a negative class), which labels, tags, categorizes, classifies, and/or characterizes data based on whether such data indicates a diabetic condition.

Additionally, or alternatively, an example label indicator may represent, indicate, store and/or comprise an example multi-classification label indicator. In some embodiments, the term "multi-classification label indicator" refers to a type of label indicator that labels, tags, categorizes, classifies, and characterizes data into one or more of more than two distinct classes or categories. Continuing from the healthcare example above, an example multi-classification label indicator may indicate one of "low diabetic risk," (e.g., a first class), "medium diabetic risk" (e.g., a second class) or "low diabetic risk" (e.g., a third class), which labels, tags, categorizes, classifies, and/or characterizes data based on a risk level or likelihood of developing a diabetic condition.

While the description above provides example types of label indicators, it is noted that the scope of the present disclosure is not limited to the description above. Continuing from the healthcare example above, example label indicators may represent, indicate, store and/or comprise one or more diagnosis identifiers, codes, and/or categories, one or more procedure identifiers, codes, and/or categories, one or more medication identifiers, codes, and/or categories, and/or the like. Additionally, or alternatively, example label indicators may represent, indicate, store and/or comprise other labels, tags, categories, classifications, characterizations, and/or the like.

In some embodiments, the term "candidate label indicator" refers to a type of label indicator that is potentially or probably associated with or applicable to a set of textual datasets. In some embodiments, the set of textual datasets may comprise a single textual dataset. In some embodiments, the set of textual datasets may comprise more than one textual dataset.

Continuing from the healthcare example above, the one or more candidate label indicators may comprise one or more diagnosis identifiers, codes, and/or categories. For example, the diagnosis identifiers, codes, and/or categories may be based on diagnosis code standards such as, but not limited to, International Classification of Diseases (ICD), Diagnostic and Statistical Manual of Mental Disorders (DSM), and/or the like. Continuing in this example, the one or more candidate label indicators may indicate one or more medical diagnoses (such as, but not limited to, infectious disease diagnoses, cardiovascular disease diagnoses, diabetic diagnoses, mental health diagnoses, and/or the like) that may potentially or probably be associated with or applicable to a set of textual datasets.

Additionally, or alternatively, the one or more candidate label indicators may comprise one or more procedure identifiers, codes, and/or categories. For example, the procedure identifiers, codes, and/or categories may be based on procedure code standards such as, but not limited to, Current Procedural Terminology (CPT), International Classification of Procedures in Medicine (ICPM), ICD-10 Procedure Coding System (ICD-10-PCS), Healthcare Common Procedure Coding System (HCPCS), and/or the like. Continuing in this example, the one or more candidate label indicators may indicate one or more medical procedures (such as, but not limited to, biopsies, laboratory tests, imaging studies, and/or the like) that may potentially or probably be associated with or applicable to a set of textual datasets.

Additionally, or alternatively, the one or more candidate label indicators may comprise one or more medication identifiers, codes, and/or categories. For example, the medication identifiers, codes, and/or categories may be based on medication code standards such as, but not limited to, National Drug Code (NDC), Anatomical Therapeutic Chemical (ATC) Classification System, and/or the like. Continuing in this example, the one or more candidate label indicators may indicate one or more medications (such as, but not limited to, clinical drugs, over-the-counter medications, and/or the like) that may potentially or probably be associated with or applicable to a set of textual datasets.

While the description above provides example candidate label indicators based on medical coding standards, it is noted that the scope of the present disclosure is not limited to the description above. In some examples, example candidate label indicators may not be based on any medical coding standards.

In various embodiments of the present disclosure, various numbers of candidate label indicators may be implemented. Continuing from the healthcare example above, fifty candidate label indicators associated with medical conditions may be implemented to improve model performance. In some embodiments, less than fifty candidate label indicators and/or more than fifty candidate label indicators may be implemented.

While the description above provides example candidate label indicators in the healthcare context, it is noted that the scope of the present disclosure is not limited to the description above. In some embodiments, example candidate label indicators in other contexts may be implemented.

Various embodiments of the present disclosure may determine and/or define one or more labels, tags, categories, classifications, characterizations, and/or the like that are potentially or probably associated with or applicable to a set of textual datasets as one or more candidate label indicators based on various means. For example, candidate label indicators may be derived from a set of textual datasets based on inputting the set of textual datasets to a machine learning model (such as, but not limited to, clustering based machine learning models, rule based machine learning models, and/or the like). In such an example, the machine learning model analyzes occurrence frequencies of concepts in the set of textual datasets to determine candidate label indicators associated with the set of textual datasets. Additionally, or alternatively, one or more candidate label indicators may be determined based on users inputs. Additionally, or alternatively, one or more candidate label indicators may be determined and/or defined through other ways.

In some embodiments, the term "predicted label indicator" refers to a type of label indicator that is determined or predicted to be associated with one or more textual datasets. As described above, an example candidate label indicator may indicate label(s), tag(s), classification(s), and/or characterization(s) that are potentially or probably associated with a set of textual datasets but have not been determined or predicted to be associated with or applicable to any particular textual dataset in the set of textual datasets. In contrast, an example predicted label indicator may indicate label(s), tag(s), classification(s), and/or characterization(s) that are predicted or determined to be associated with or applicable to one or more particular textual datasets from the set of textual datasets.

Continuing from the healthcare example above, candidate label indicators may comprise a multi-classification label indicator that include classifications such as "high diabetic risk," "medium diabetic risk" or "low diabetic risk." In this example, candidate label indicators provide a pool of potential label indicator(s) that may be associated with textual datasets from the set of textual datasets, and predicted label indicators associated with these textual datasets may be selected from the pool of potential label indicator(s). Continuing this example, example embodiments of the present disclosure may generate one or more predicted label indicators associated with each textual dataset from the set of textual datasets based on the plurality of candidate label indicators. For example, example embodiments of the present disclosure may determine or predict that a first subset of these textual datasets is associated with a "high diabetic risk" label indicator, may determine or predict that a second subset of these textual datasets is associated with a "medium diabetic risk" label indicator, and may determine or predict that no textual dataset from the set of textual datasets is associated with a "low diabetic risk" label indicator. In such an example, example embodiments of the present disclosure may generate predicted label indicator(s) indicating "high diabetic risk" associated with the first subset of textual datasets, may generate predicted label indicator(s) indicating "medium diabetic risk" associated with the second subset of textual datasets, and may not generate any predicted label indicator indicating "low diabetic risk" associated with any textual dataset from the set of textual datasets.

Various embodiments of the present disclosure may generate one or more predicted label indicators based on implementing one or more machine learning models. In some embodiments, one or more example predicted label indicators may be generated based on inputting one or more candidate label indicators and one or more textual datasets to one or more dataset classification predicting machine learning models. In such examples, candidate label indicators refer to possible labels, tags, categories, classifications, characterizations, and/or the like that a dataset classification predicting machine learning model may (or may not) assign to a specific textual dataset, and predicted label indicators refer to the actual labels assigned to the specific textual dataset by the dataset classification predicting machine learning model based on generated predictions.

In some embodiments, the terms "dataset classification predicting machine learning model," "document classifier," and "classifier" refer to a type of machine learning model that generates one or more predictions on one or more labels, tags, categories, classifications, characterizations, and/or the like that are associated with or assigned to the one or more textual datasets. For example, an example dataset classification predicting machine learning model may generate one or more predicted label indicators associated with the one or more textual datasets. In accordance with various embodiments of the present disclosure, an example dataset classification predicting machine learning model may comprise one or more of Naive Bayes classifiers, Support Vector Machines (SVMs), decision trees, random forest, Convolutional Neural Networks (CNNs), Recurrent Neural Networks (RNNs), and/or the like.

For example, an example dataset classification predicting machine learning model may receive one or more textual datasets and one or more candidate label indicators as inputs. In some examples, the example dataset classification predicting machine learning model may generate one or more predicted probabilities of one or more candidate label indicators being associated with the one or more textual datasets, and generate one or more predicted label indicators based on the one or more predicted probabilities.

As an example, one or more candidate label indicators may comprise one or more candidate binary classification label indicators. In such an example, an example dataset classification predicting machine learning model may determine whether a predicted probability of a textual dataset being associated with the positive class of a candidate binary classification label indicator satisfies a probability threshold. If the predicted probability satisfies the probability threshold, the example dataset classification predicting machine learning model determines that the textual dataset is predicted to be associated with the positive class of the candidate binary classification label indicator. If the predicted probability does not satisfy the probability threshold, the example dataset classification predicting machine learning model determines that the textual dataset is predicted to be associated with the negative class of the candidate binary classification label indicator. As illustrated in this example, various embodiments of the present disclosure may achieve binary labeling by setting a probability threshold for each potential label indicator.

Continuing from the healthcare example above, the example dataset classification predicting machine learning model may receive a textual dataset that comprises one or more EHRs, and one or more candidate label indicators that include, but not limited to, one or more binary classification label indicators such as "diabetic" or "non-diabetic." In such an example, the example dataset classification predicting machine learning model may use statistical models and/or deep learning algorithms to learn patterns and relationships in the textual dataset (based on features such as semantic similarity, word frequency, word co-occurrence, and/or the like) and generate predicted probability that the textual dataset is associated with the "diabetic" label indicator. The example dataset classification predicting machine learning model may compare the predicted probability with the corresponding probability threshold and may determine that the predicted probability satisfies the corresponding probability threshold. In such an example, the example dataset classification predicting machine learning model generates a predicted label indicator that indicates the textual dataset is predicted to be associated with a "diabetic" predicted label indicator.

Additionally, or alternatively, one or more candidate label indicators may comprise one or more candidate multi-classification label indicators. For example, an example dataset classification predicting machine learning model may determine predicted probabilities of a textual dataset being associated with each class of a candidate multi-classification label indicator, and may generate one or more predicted label indicators based on the predicted probabilities.

For example, the example dataset classification predicting machine learning model may compare the predicted probabilities with corresponding probability threshold(s). If the predicted probability of a classification of a candidate multi-classification label indicator satisfies the probability threshold, the example dataset classification predicting machine learning model determines that the textual dataset is predicted to be associated with the classification of the candidate multi-classification label indicator. If the predicted probability of a classification of a candidate multi-classification label indicator does not satisfy the probability threshold, the example dataset classification predicting machine learning model determines that the textual dataset is not predicted to be associated with the classification of the candidate multi-classification label indicator.

In some embodiments, the example dataset classification predicting machine learning model may compare the plurality of predicted probabilities associated with the plurality of classifications of a candidate multi-classification label indicator, may determine a highest predicted probability among the plurality of predicted probabilities, and may generate a predicted label indicator based on the classification of the candidate multi-classification label indicator associated with the highest predicted probability.

Continuing from the healthcare example above, the example dataset classification predicting machine learning model may receive a textual dataset that may comprise one or more EHRs, as well as one or more candidate label indicators that may include, but not limited to, a multi-classification label indicator with classifications including "high diabetic risk," "medium diabetic risk," and "low diabetic risk." In such an example, the example dataset classification predicting machine learning model may use statistical models and/or deep learning algorithms to learn patterns and relationships in the textual dataset (based on features such as semantic similarity, word frequency, word co-occurrence, and/or the like) and generate predicted probabilities that the textual dataset is associated with each of the "high diabetic risk" classification, the "medium diabetic risk" classification, and the "low diabetic risk" classification. In some embodiments, the example dataset classification predicting machine learning model may compare the predicted probabilities with corresponding probability threshold(s) and may determine that the predicted probability of the textual dataset being associated with the "high diabetic risk" classification satisfies the corresponding probability threshold, and that the predicted probability of the textual dataset being associated with the "medium diabetic risk" classification and the predicted probability of the textual dataset being associated with the "low diabetic risk" classification do not satisfy the corresponding probability threshold(s). In such an example, the example dataset classification predicting machine learning model generates a predicted label indicator indicating that the textual dataset is predicted to be associated with a "high diabetic risk" classification. In some embodiments, the example dataset classification predicting machine learning model may compare the predicted probabilities, and determine that the predicted probability of the textual dataset being associated with the "high diabetic risk" classification is the highest. In such an example, the example dataset classification predicting machine learning model generates a predicted label indicator indicating that the textual dataset is predicted to be associated with a "high diabetic risk" label indicator.

While the description above provides examples of generating predicted label indicators, it is noted that the scope of the present disclosure is not limited to the description above. In some examples, an example dataset classification predicting machine learning model may generate predicted label indicators through other ways.

In some embodiments, an example dataset classification predicting machine learning model may be trained to generate predicted label indicators. For example, a computing entity (such as, but not limited to, the QA machine learning model computing entity 106 described above in connection with FIG. 1 and FIG. 2) may perform supervised training on the dataset classification predicting machine learning model. In such an example, the dataset classification predicting machine learning model may receive one or more classification training datasets that comprise textual datasets and predetermined label indicators that have been determined to be associated with the textual datasets. During training, the dataset classification predicting machine learning model may adjust one or more internal parameters associated with the dataset classification predicting machine learning model so as to minimize error functions and/or loss functions.

Continuing from the healthcare example above, the example dataset classification predicting machine learning model may be trained to predict whether a textual dataset (for example, one or more EHRs) is associated with a "diabetic" label indicator or a "non-diabetic" label indicator. In such an example, the example dataset classification predicting machine learning model may receive one or more classification training datasets that comprise textual datasets (for example, one or more EHRs) that have been predetermined to be associated with the "diabetic" label indicator and/or one or more classification training datasets that comprise textual datasets (for example, one or more EHRs) that have been predetermined to be associated with the "non-diabetic" label indicator. Continuing in this example, the dataset classification predicting machine learning model may generate predicted label indicators associated with textual datasets, and compare the predicted label indicators with the predetermined label indicators. The dataset classification predicting machine learning model may further adjust one or more of its parameters so that the predicted label indicators match the predetermined label indicators.

While the description above provides an example training of an example dataset classification predicting machine learning model, it is noted that the scope of the present disclosure is not limited to the description above. In some examples, an example dataset classification predicting machine learning model may be trained through other ways.

In some embodiments, the term "prediction explanation indicator" refers to a data point that represents, indicates, stores and/or comprises one or more descriptions and/or visualizations that explain, clarify, and/or justify why one or more predicted label indicators are predicted to be associated one or more textual datasets by one or more dataset classification predicting machine learning models. In some embodiments, the prediction explanation indicators may highlight the relevant features and/or attributes from textual datasets that contributed to the predictions on label indicators generated by the dataset classification predicting machine learning model. In some embodiments, an example prediction explanation indicator may be in human-interpretable forms such as, but not limited to, one or more text strings, one or more numerical values, one or more characters, one or more visualizations, and/or the like.

Continuing from the healthcare example above, an example dataset classification predicting machine learning model may generate one or more predicted label indicators associated with a textual dataset that include a "high diabetic risk" label indicator. In such an example, example embodiments of the present disclosure may generate a prediction explanation indicator associated with the "high diabetic risk" label indicator, and the prediction explanation indicator may comprise a textual description that explain, clarify, and/or justify why the "high diabetic risk" label indicator is predicted to be associated the textual dataset by an example dataset classification predicting machine learning model.

Various embodiments of the present disclosure may generate one or more prediction explanation indicators based on implementing one or more machine learning models. In some embodiments, one or more prediction explanation indicators may be generated based on inputting one or more textual datasets and one or more predicted label indicators that are associated with the one or more textual datasets to a classification explanation predicting machine learning model.

In some embodiments, the terms "classification explanation predicting machine learning model," "document explainer," and "explainer" refer to a type of machine learning model that generates one or more prediction explanation indicators that explain, clarify, and/or justify reasons why one or more predicted label indicators are associated with or assigned to one or more textual datasets. In some embodiments, an example classification explanation predicting machine learning model works in concert with a dataset classification predicting machine learning model and helps a human user understand the reason why the dataset classification predicting machine learning model has assigned one or more particular predicted label indicators to one or more textual datasets. In some embodiments, the inputs to an example classification explanation predicting machine learning model may include, but are not limited to (a) the same textual dataset(s) that is provided as input into the dataset classification predicting machine learning model and (b) the one or more predicted label indicators that are assigned to the textual dataset(s) by the dataset classification predicting machine learning model. In some embodiments, the output of an example classification explanation predicting machine learning model may include, but not limited to, one or more textual descriptions that help a human user understand why the one or more predicted label indicators are assigned to the one or more textual datasets.

In accordance with various embodiments of the present disclosure, an example classification explanation predicting machine learning model may comprise one or more types of machine learning models. For example, an example dataset classification predicting machine learning model may comprise an extraction-based classification explanation predicting machine learning model.

In some embodiments, the term "extraction-based classification explanation predicting machine learning model" refers to a type of dataset classification predicting machine learning model that generates one or more prediction explanation indicators based on one or more textual subsets from one or more textual datasets. In some embodiments, the term "textual subset" refers to a subset or a portion from one or more textual datasets.

For example, an extraction-based classification explanation predicting machine learning model may identify and extract key words, phrases, and sentences from one or more textual datasets that contributed to the dataset classification predicting machine learning model in assigning the predicted label indicators to the one or more textual datasets. In such an example, an example explanatory output from an example extraction-based classification explanation predicting machine learning model may include, but not limited to, a subset of the original textual dataset.

Continuing from the healthcare example, the extraction-based classification explanation predicting machine learning model may analyze a textual dataset (for example, an EHR) and a predicted label indicator indicating "high diabetic risk" that is assigned to the textual dataset by an example dataset classification predicting machine learning model. The extraction-based classification explanation predicting machine learning model may determine the most relevant or influential parts of the textual dataset (for example, the EHR) that influenced the dataset classification predicting machine learning model's prediction. For example, the extraction-based classification explanation predicting machine learning model may examine feature importance, attention weights, or other model-specific characteristics that can help identify the most relevant portions of the text. In some embodiments, the extracted information is then presented to the user as an explanation for the prediction from the dataset classification predicting machine learning model. As an example, the extraction-based classification explanation predicting machine learning model may extract the following textual datasets from the EHR as prediction explanation indicators: "family history of diabetes," "high level of body mass index," and "sedentary lifestyle." In such an example, the extraction-based classification explanation predicting machine learning model predicts that the dataset classification predicting machine learning model assigned the "high diabetic risk" label indicator to the EHR because, for example, the EHR indicated "family history of diabetes," "high level of body mass index," and "sedentary lifestyle."

In some embodiments, an example extraction-based classification explanation predicting machine learning model may be implemented based on a Masked Sampling Procedure (MSP) that uses multiple iterations of a classifier with random masking of the textual dataset on each iteration to determine textual subsets from the textual dataset that are most predictive of the predicted label indicators assigned by the classifier. In some embodiments, MSP has shown dramatic advantages over many other explainers and is one of the preferred classification explanation predicting machine learning models. In some embodiments, an example extraction-based classification explanation predicting machine learning model may be based on various examples described in U.S. patent application Ser. No. 18/046,831, filed Oct. 14, 2022, and titled "SYSTEMS AND METHODS FOR PROCESSING MACHINE LEARNING LANGUAGE MODEL CLASSIFICATION OUTPUTS VIA TEXT BLOCK MASKING," the entire content of which is incorporated by references in its entirety.

While the description above provides an example type of classification explanation predicting machine learning model, it is noted that the scope of the present disclosure is not limited to the description above. In some examples, an example classification explanation predicting machine learning model may comprise one or more additional and/or alternative types. For example, an example classification explanation predicting machine learning model in accordance with some embodiments of the present disclosure may be implemented based on a model distillation approach, similar to those example described in MODEL DISTILLATION FOR FAITHFUL EXPLANATIONS OF MEDICAL CODE PREDICTIONS by Zach Wood-Doughty et al. As another example, an example classification explanation predicting machine learning model in accordance with some embodiments of the present disclosure may be implemented based on the sampling and occlusion approach described in TOWARDS HIERARCHICAL IMPORTANCE ATTRIBUTION: EXPLAINING COMPOSITIONAL SEMANTICS FOR NEURAL SEQUENCE MODELS by Xisen Jin et al. As another example, an example classification explanation predicting machine learning model in accordance with some embodiments of the present disclosure may be implemented based on GradSHAP as described in A UNIFIED APPROACH TO INTERPRETING MODEL PREDICTIONS by Scott M. Lundberg et al.

In some embodiments, an example classification explanation predicting machine learning model generates an example prediction score indicator associated with each prediction explanation indicator. In some embodiments, the terms "prediction score indicator" or "informativeness score" refer to a data point that quantifies the significance or importance of a prediction explanation indicator in contributing to the predicted label indicator generated by the dataset classification predicting machine learning model. For example, an example prediction score indicator may indicate a predicted importance level associated with a prediction explanation indicator. In some embodiments, the term "predicted importance level" refers to a predicted level of contribution that the prediction explanation indicator provides to the dataset classification predicting machine learning model in generating the predicted label indicator. The higher the predicted importance level, the more significantly that the prediction explanation indicator contributed to the dataset classification predicting machine learning model in generating the predicted label indicator.

For example, prediction explanation indicators generated by an example extraction-based classification explanation predicting machine learning model may comprise textual datasets from textual datasets. In such an example, the example extraction-based classification explanation predicting machine learning model may generate one or more prediction score indicators associated with each textual dataset that indicate how well each textual dataset explains the predicted label indicator assigned to the textual dataset by the dataset classification predicting machine learning model.

Continuing from the healthcare example above, an example classification explanation predicting machine learning model may generate prediction explanation indicators that include "family history of diabetes," "high level of body mass index," and "sedentary lifestyle" in explaining the "high diabetic risk" label indicator assigned to the textual dataset by a dataset classification predicting machine learning model. As an example, the example classification explanation predicting machine learning model may assign a prediction score indicator indicating 0.9 to the prediction explanation indicator indicating "family history of diabetes," a prediction score indicator indicating 0.7 to the prediction explanation indicator indicating "high level of body mass index," and a prediction score indicator indicating 0.5 to the prediction explanation indicator indicating "sedentary lifestyle." In this example, "family history of diabetes" from the EHR may contribute more significantly in dataset classification predicting machine learning model assigning the "high diabetic risk" label indicator to the EHR as compared to the contributions by "high level of body mass index" and "sedentary lifestyle."

In some embodiments, the term "prediction score ranking" refers to a ranking of prediction score indicators associated with prediction explanation indicators. For example, a higher prediction score indicator (and its associated prediction explanation indicator) may be ranked higher than a lower prediction score indicator (and its associated prediction explanation indicator).

In some embodiments, the term "prediction score threshold" refers to a threshold associated with the prediction score indicator. In some embodiments, the prediction score threshold is set to distinguish between those prediction explanation indicators that significantly contribute to the dataset classification predicting machine learning model's decision-making process in generating the predicted label indicators and those prediction explanation indicators that do not make significant contributions. For example, if a prediction score indicator satisfies the prediction score threshold, an example classification explanation predicting machine learning model may determine that the prediction explanation indicator associated with prediction score indicator significantly contributes to the dataset classification predicting machine learning model's decision-making process in generating the predicted label indicators.

In some embodiments, an example classification explanation predicting machine learning model may be trained to generate prediction explanation indicators, which may be validated. For example, human subject matter experts (SMEs) may score prediction explanation indicators based on how well the prediction explanation indicators explain their corresponding predicted label indicators, and the example classification explanation predicting machine learning model may adjust one or more of its parameters based on the scores from the human SMEs.

In some embodiments, the term "structured label-explanation dataset" refers to an organized collection of data points that include, but not limited to, predicted label indicators and prediction explanation indicators. For example, an example structured label-explanation dataset may comprise a label-explanation matrix dataset. In some embodiments, the term "label-explanation matrix dataset" refers to a type of structured label-explanation dataset that is in a tabular format with rows representing predicted label indicators and columns representing predicted label indicators. Additional details and examples associated with the structured label-explanation datasets and the label-explanation matrix datasets are described and illustrated herein.

In some embodiments, the terms "QA machine learning model" and "QA model" refer to a type of machine learning model that receives answer indicator prediction requests as inputs and generates predicted answer indicators as outputs. For example, an example QA machine learning model may receive a first chunk of text that is interpreted as a question, and may deliver a second chunk of text that is intended as an answer to the question.

In accordance with various embodiments of the present disclosure, example QA machine learning models may be associated with different types. For example, an example QA machine learning model in accordance with some embodiments of the present disclosure may be a rule-based machine learning model that generates predicted answer indicators based on one or more predefined rules. Additionally, or alternatively, an example QA machine learning model in accordance with some embodiments of the present disclosure may be an information retrieval-based model that generates predicted answer indicators based on retrieving answers from one or more datasets. Additionally, or alternatively, an example QA machine learning model in accordance with some embodiments of the present disclosure may be a deep learning based machine learning model that uses deep neural networks to automatically learn relationships between questions and answers through training. Examples of QA machine learning models in accordance with some embodiments of the present disclosure may include, but are not limited to, Bidirectional Encoder Representations from Transformers (BERT), Robustly Optimized BERT (RoBERTa), Generative Pre-trained Transformer (GPT), and/or the like.

In some embodiments, an example QA machine learning model may be trained to generate prediction explanation indicators in a supervised fashion. For example, an example QA machine learning model may be trained using QA training datasets. In some embodiments, the term "QA training dataset" refers to labeled datasets that are used for training QA machine learning models.

For example, an example QA training dataset may comprise a plurality of training question indicators and a plurality of training answer indicators. In some embodiments, an example QA training dataset defines a plurality of corresponding relationships between the plurality of training question indicators and the plurality of training answer indicators. In some embodiments, each of the plurality of training question indicators is labeled with one of the plurality of training answer indicators.

For example, each of the plurality of training question indicators is associated with one of the plurality of training answer indicators. In such an example, the training answer indicator that is associated with the training question indicator indicates a predetermined answer to the question indicated by the training question indicator. In some embodiments, the QA machine learning model may adjust one or more internal parameters associated with the QA machine learning model so as to minimize error functions and/or loss functions, similar to various examples described above.

In some embodiments, the term "synthetic QA training dataset" refers to a type of QA training dataset that is generated based on implementing one or more dataset classification predicting machine learning models and one or more classification explanation predicting machine learning models, details of which are described herein.

In some embodiments, an example synthetic QA training dataset comprises a plurality of synthetic training question indicators and a plurality of synthetic training answer indicators. In some embodiments, the term "synthetic training question indicator" refers to a training question indicator in an example synthetic QA training dataset. In some embodiments, the term "synthetic training answer indicator" refers to a training answer indicator in an example synthetic QA training dataset.

In some embodiments, the term "human-annotated QA training dataset" refers to a type of QA training dataset that is generated based on inputs from human SMEs. For example, a human SME may provide inputs to label each training question indicator with a corresponding training answer indicator, therefore defining the corresponding relationships between the plurality of training question indicators and the plurality of training answer indicators in the human-annotated QA training dataset.

In some embodiments, the term "mixed QA training dataset" refers to a type of QA training dataset that comprises one or more synthetic QA training datasets and one or more human-annotated QA training datasets.

In some embodiments, the term "untrained QA machine learning model" refers to a type of QA machine learning model that that has not been trained based on a QA training dataset (including, but not limited to, synthetic QA training dataset, human-annotated QA training dataset, and/or mixed QA training dataset) in accordance with some embodiments of the present disclosure.

In some embodiments, the term "trained QA machine learning model" refers to a type of QA machine learning model that has been trained based on a QA training dataset (including, but not limited to, synthetic QA training dataset, human-annotated QA training dataset, and/or mixed QA training dataset) in accordance with some embodiments of the present disclosure.

IV. OVERVIEW, TECHNICAL IMPROVEMENTS, AND TECHNICAL ADVANTAGES

As described above, QA machine learning models require training to predict answer indicators in response to answer indicator prediction requests. As an example, search engines (for example, but not limited to, internet search engines) may be used to train QA machine learning models. In such an example, after a user type a question into a search field of a search engine (for example, as indicated by the use of a question mark) through a computing entity, a search result user interface may be rendered by the computing entity, and a subset of the search results in the search result user interface that the user selects may be treated as answers to the question, thus question-answer pairs for training the QA machine learning model may be generated by the computing entity.

While the example above illustrates an example mechanism for training a QA machine learning model, such example mechanism may only be suitable to train generalized QA models on questions with low stakes. Because a user may select search results that are not answers to the question (for example, a user may select a search result merely out of curiosity), training QA machine learning models using question-answer pairs generated based on such mechanism may result in the QA machine learning models to predict answer indicators with low accuracy and low precision. As such, question-answer pairs generated based on such mechanism are not suitable for training QA machine learning models in many subject matter domains where the stakes are high.

As an example in the healthcare domain, a doctor querying documents as to proper treatment protocols may require answers from a QA machine learning model to be both accurate and precise. Inaccurate or imprecise information may lead to incorrect diagnoses, inappropriate treatments, or harmful medical advice, which may potentially endanger patients' lives or worsen their conditions. Each patient is unique with their own medical history, genetics, and environmental factors, and QA machine learning models must be precise and accurate to account for these individual differences and provide personalized recommendations. As such, there is a need to fine-tune generalized QA machine learning models to improve their performance within specialized fields such as healthcare.

There are many technical challenges and difficulties associated with training and fine-tuning QA machine learning models. For example, while many QA machine learning models do not require architecture modifications to improve their performance, they do require high quality training QA dataset that are tailored to the subject matter domain (such as, but not limited to, healthcare domain). However, there is a lack of high quality training QA datasets that are subject matter domain specific. Researchers are already beginning to discuss the possibility of running out of high quality training QA dataset for training QA machine learning models (for example, as discussed in WILL WE RUN OUT OF DATA? AN ANALYSIS OF THE LIMITS OF SCALING DATASETS IN MACHINE LEARNING by Pablo Villalobos et al.). As illustrated in the healthcare example above, the lack of high quality training QA datasets may result in the QA machine learning model to generate inaccurate and imprecise answer indicators.

Some approaches may attempt to generate training QA datasets by relying on human SMEs. For example, some approaches may employ healthcare clinicians to manually annotate a small set of medical documents with QA pairs. However, such small datasets are not sufficient to train performant, reliable QA systems for healthcare applications.

Various embodiments of the present disclosure overcome these technical challenges and difficulties associated with training QA machine learning models, and provide various technical improvements and advantages. For example, by implementing one or more dataset classification predicting machine learning models together with one or more classification explanation predicting machine learning models, various embodiments of the present disclosure generate synthetic QA training datasets for training QA machine learning models. By training QA machine learning models based on the synthetic QA training datasets, various embodiments of the present disclosure solve technical problems of how to automatically fine-tuning QA models to improve their precision, accuracy, and effectiveness, especially in the context of a specialized subject matter domain (such as, but not limited to, in the healthcare context).

Continuing from the healthcare example above, various embodiments of the present disclosure generate synthetic QA training datasets based on implementing machine learning models to predict document labels that classify textual datasets (such as, but not limited to, clinical text) comprising clinical information naturally associated with medical documents (such as, but not limited to, the medical conditions of a patient) and implementing machine learning models to predict explanations as to the reasons why the document labels are predicted for these textual datasets. In some embodiments, synthetic QA training datasets are generated based on mapping predicted document labels (as training question indicators) to explanations on why the machine learning model predicts these document labels (as training answer indicators). While the training QA datasets generated by various embodiments of the present disclosure may be referred to as "synthetic QA training dataset," it noted that the synthetic QA training dataset may describe real medical condition labels and their associated text that naturally occurs in medical documents. For example, various embodiments of the present disclosure may use medical condition descriptions that can be joined to medical notes as questions in synthetic QA training dataset, and sentence or token block-level explanations from the document as answers in synthetic QA training dataset. In some embodiments, various embodiments of the present disclosure further combine and/or filter these synthetic QA training datasets according to prediction score indicators that are generated by a classification explanation predicting machine learning model. As such, various embodiments of the present disclosure may provide various technical improvements and advantages such as, but not limited to, improving the performance of QA machine learning model without the use of expensive human SMEs (e.g., doctors).

Additionally, various embodiments of the present disclosure may substantially reduce resource costs associated with training QA machine learning models and increase availability of SMEs to perform their other essential functions (e.g., practicing medicine). Information retrieval (IR) problems account for hundreds of millions of dollars in healthcare operations costs arising in settings such as, but not limited to, risk adjusting insured populations using text from medical charts, conducting Health Effectiveness Data and Information Set (HEDIS) reviews, conducting Payment Integrity (PI) medical record reviews, conducting Prior Authorization (PA) request reviews using text from medical charts, predicting disease progression and appropriate level of care for healthcare patients using medical record text, identifying signs and symptoms of disease in medical text for Health Economics and Outcomes Research (HEOR) with pharmacy clients, triaging messages to clinicians in healthcare portals by identifying severity and urgency of patient needs, and/or the like. Example QA machine learning models that have been trained in accordance with some embodiments of the present disclosure may effectively, accurately, and precisely provide insights on demand by automating information retrieval through a simple query interface.

While some example embodiments of the present disclosure are described to highlight improved performance of QA machine learning model in the healthcare context, it is noted that the scope of the present disclosure is not limited to the healthcare context. For example, various embodiments of the present disclosure may provide technical approach for transforming a multi-label classification dataset into an extractive QA dataset that may be used for training QA machine learning model to improve the precision, accuracy, and reliability in predicting answer indicators in a variety of subject matter domains.

V. EXAMPLE SYSTEM OPERATIONS

Figure 4:
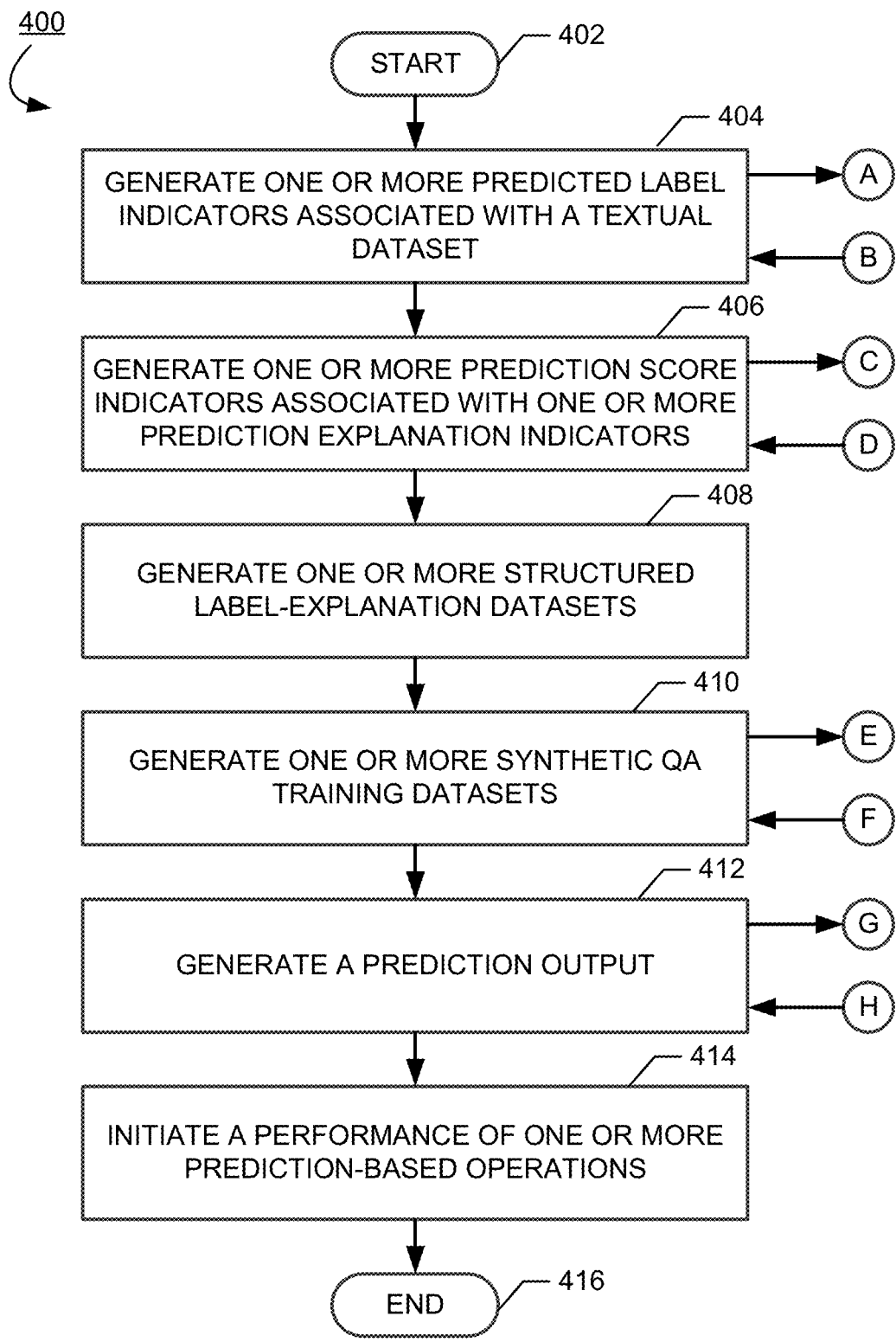
FIG. 4 is an example flowchart diagram of an example method for improving accuracy and precision of QA machine learning models in generating predictions by training the QA machine learning models in accordance with some embodiments discussed herein.

FIG. 4 is an example flowchart diagram of an example method for improving accuracy and reliability of QA machine learning models in generating predictions by training the QA machine learning models in accordance with some embodiments discussed herein.

As described above, there are technical challenges, deficiencies, and problems associated with machine learning models, and various example embodiments of the present disclosure overcome such technical challenges, deficiencies, and problems. For example, FIG. 4 illustrates an example flowchart diagram of an example method 400 for improving precision, accuracy, and effectiveness of predictions generated by an example QA machine learning model in accordance with some embodiments discussed herein.

For example, the example method 400 may improve precision and accuracy of QA machine learning model generated predictions by training the QA machine learning model based on the synthetic QA training datasets. In some embodiments, by generating the synthetic QA training datasets based on implementing one or more dataset classification predicting machine learning models and one or more classification explanation predicting machine learning models, various embodiments of the present disclosure overcome technical challenges and difficulties associated with training machine learning models due to a lack of high quality QA training datasets.

Referring now to FIG. 4, example methods in accordance with some embodiments of the present disclosure start at step/operation 402. Subsequent to and/or in response to step/operation 402, some example methods in accordance with some embodiments of the present disclosure proceed to step/operation 404. In some embodiments, a processor (such as, but not limited to, the QA machine learning model computing entity 106 described above in connection with FIG. 1 and FIG. 2) generates one or more predicted label indicators associated with a textual dataset at step/operation 404.

In some embodiments, the processor generates one or more predicted label indicators associated with the textual dataset based on inputting a textual dataset to a dataset classification predicting machine learning model. As described above, an example dataset classification predicting machine learning model generates one or more predictions on one or more labels, tags, categories, classifications, characterizations, and/or the like that are associated with or assigned to the textual dataset.

While the description above provides an example of inputting one textual dataset to the example dataset classification predicting machine learning model, it is noted that the scope of the present disclosure is not limited to the description above. In some examples, an example dataset classification predicting machine learning model may receive more than one textual dataset (for example, a corpus of textual datasets) and may generate one or more predicted label indicators associated with the corpus of textual datasets.

In some embodiments, the example dataset classification predicting machine learning model receives not only the textual dataset as an input, but also one or more candidate label indicators as one or more additional inputs. In some embodiments, the example dataset classification predicting machine learning model may generate the predicted label indicators based on the candidate label indicators, additional details of which are described in connection with at least FIG. 6.

Subsequent to and/or in response to step/operation 404, some example methods in accordance with some embodiments of the present disclosure proceed to step/operation 406. In some embodiments, a processor (such as, but not limited to, the QA machine learning model computing entity 106 described above in connection with FIG. 1 and FIG. 2) generates one or more prediction score indicators associated with one or more prediction explanation indicators at step/operation 406.

In some embodiments, the processor generates the one or more prediction score indicators associated with the one or more prediction explanation indicators based on inputting the textual dataset and the one or more predicted label indicators to a classification explanation predicting machine learning model.

For example, the classification explanation predicting machine learning model may generate one or more prediction explanation indicators that explain, clarify, and/or justify why one or more predicted label indicators are predicted to be associated one or more textual datasets by one or more dataset classification predicting machine learning models described above in connection with step/operation 404. In such an example, the classification explanation predicting machine learning model may further generate a prediction score indicator corresponding to each prediction explanation indicator and indicating a significance or importance of the prediction explanation indicator in contributing to the predicted label indicator generated by the dataset classification predicting machine learning model at step/operation 404.

Subsequent to and/or in response to step/operation 406, some example methods in accordance with some embodiments of the present disclosure proceed to step/operation 408. In some embodiments, a processor (such as, but not limited to, the QA machine learning model computing entity 106 described above in connection with FIG. 1 and FIG. 2) generates one or more structured label-explanation datasets at step/operation 408.

In some embodiments, the processor generates the one or more structured label-explanation datasets based on the one or more predicted label indicators generated at step/operation 404, as well as the one or more prediction explanation indicators and the one or more prediction score indicators generated at step/operation 406.

For example, the processor may generate a label-explanation matrix dataset that comprises a plurality of columns and a plurality of rows defining a plurality of cells. In such an example, the plurality of columns corresponds to the plurality of predicted label indicators generated by the dataset classification predicting machine learning model described above in connection with at least step/operation 404, the plurality of rows corresponds to the plurality of prediction explanation indicators generated by the classification explanation predicting machine learning model described above in connection with at least step/operation 406, and the plurality of cells corresponding prediction score indicators generated by the classification explanation predicting machine learning model described above in connection with at least step/operation 406.

While the description above provides an example structure of an example structured label-explanation dataset, it is noted that the scope of the present disclosure is not limited to the description above. In some examples, an example structured label-explanation dataset may be in one or more additional or alternative structures.

Subsequent to and/or in response to step/operation 408, some example methods in accordance with some embodiments of the present disclosure proceed to step/operation 410. In some embodiments, a processor (such as, but not limited to, the QA machine learning model computing entity 106 described above in connection with FIG. 1 and FIG. 2) generates one or more synthetic QA training datasets at step/operation 410.

In some embodiments, the processor generates the one or more synthetic QA training datasets based on the one or more structured label-explanation datasets described in connection with at least step/operation 408 and a prediction score threshold.

As described above, the structured label-explanation datasets may indicate one or more prediction score indicators, as well as one or more predicted label indicators and one or more prediction explanation indicators that are associated with each of the one or more prediction score indicators. In some embodiments, the processor compares each of the one or more prediction score indicators with the prediction score threshold, and selects one or more predicted label indicators and one or more prediction explanation indicators that are associated with one or more predicted label indicators satisfying the prediction score threshold. Additional examples of generating the one or more synthetic QA training datasets are described herein, including, but not limited to, those described in connection with at least FIG. 9.

In some embodiments, the synthetic QA training datasets comprise a plurality of synthetic training question indicators and a plurality of synthetic training answer indicators. In some embodiments, the processor may generate the plurality of synthetic training question indicators based on the one or more selected predicted label indicators, and may generate the plurality of synthetic training answer indicators based on the one or more selected prediction explanation indicators.

Subsequent to and/or in response to step/operation 410, some example methods in accordance with some embodiments of the present disclosure proceed to step/operation 412. In some embodiments, a processor (such as, but not limited to, the QA machine learning model computing entity 106 described above in connection with FIG. 1 and FIG. 2) generates a prediction output at step/operation 412.

In some embodiments, the processor generates one or more prediction outputs using one or more QA machine learning models that are trained based on the synthetic QA training datasets.

In some embodiments, the processor generates one or more trained QA machine learning models based on inputting the one or more synthetic QA training datasets to one or more untrained QA machine learning models for training. For example, when training the QA machine learning models, the QA machine learning models generate predicted answer indicators based on the training question indicators from the QA training datasets described above in connection with at least step/operation 410, and compare the predicted answer indicators with the corresponding training answer indicators. In such an example, the processor may further adjust one or more of the parameters associated with the QA machine learning models so that the predicted answer indicators match the training answer indicators.

As illustrated in various embodiments of the present disclosure, some techniques of the present disclosure enable the generation of new machine learning models (such as, but not limited to, new QA machine learning models) with parameters that are specifically trained and tailored to perform one or more predictive actions to achieve real-world affects. The machine learning models of the present disclosure may be used, applied, and/or otherwise leveraged to generate predictions. These predictions may be leveraged to initiate the performance of various computing tasks that improve the performance of a computing system (e.g., a computer itself, etc.) with respect to various predictive actions performed by the computing system.

In some embodiments, an example prediction output may comprise a response (for example, a predicted answer indicator) that is generated in response to an answer indicator prediction requests from other computing entities (such as, but not limited to, the client computing entity 102A, the client computing entity 102B, . . . , the client computing entity 102N). In some embodiments, an example prediction output may comprise additional and/or alternative data based on the prediction domain such as, but not limited to, healthcare domain.

For example, an example prediction output in the healthcare domain may include, but are not limited to, but are not limited to, predicted patient risk stratification. For example, example QA machine learning models in accordance with some embodiments of the present disclosure that have been trained using one or more synthetic QA training datasets may generate example prediction outputs that identify patients at high risk of certain medical conditions (such as, but not limited to, high risk of diabetes).

Additionally, or alternatively, an example prediction output in the healthcare domain may include, but are not limited to, but are not limited to, predicted hospital readmission rates. For example, example QA machine learning models in accordance with some embodiments of the present disclosure that have been trained using one or more synthetic QA training datasets may generate example prediction outputs that indicates the likelihood that one or more patients will be readmitted to the hospital.

Additionally, or alternatively, an example prediction output in the healthcare domain may include other data and/or information.

While the description above illustrates example prediction outputs in the healthcare domain, it is noted that the scope of the present disclosure is not limited to the healthcare domain. In some embodiments, example prediction outputs may be applied in other domains such as, but not limited to, financial systems, autonomous systems, robotic systems, and/or the like.

Subsequent to and/or in response to step/operation 412, some example methods in accordance with some embodiments of the present disclosure proceed to step/operation 414. In some embodiments, a processor (such as, but not limited to, the QA machine learning model computing entity 106 described above in connection with FIG. 1 and FIG. 2) initiates a performance of one or more prediction-based operations based on the prediction output at step/operation 414.

Continuing from the example above, the processor may receive one or more answer indicator prediction requests from other computing entities (such as, but not limited to, one or more of the client computing entity 102A, the client computing entity 102B, . . . , the client computing entity 102N described above in connection with FIG. 1). In such an example, the answer indicator prediction requests may comprise one or more queries or questions, and the processor may generate predicted answer indicators based on inputting the one or more queries or questions to the one or more trained QA machine learning models. Subsequently, the processor may transmit the predicted answer indicators to other computing entities (such as, but not limited to, one or more of the client computing entity 102A, the client computing entity 102B, . . . , the client computing entity 102N described above in connection with FIG. 1).

Additionally, or alternatively, the processor may cause rendering of one or more user interfaces on one or more displays from other computing entities (such as, but not limited to, one or more of the client computing entity 102A, the client computing entity 102B, . . . , the client computing entity 102N described above in connection with FIG. 1). For example, the one or more user interfaces may comprise one or more query input interface elements that allows a user to input a question or a query. The processor may input the question or the query to the one or more trained QA machine learning models, and render one or more predicted answer indicators from the one or more trained QA machine learning models on the one or more user interfaces.

While the description above provides example performance of one or more prediction-based operations, it is noted that the scope of the present disclosure is not limited to the description above. In some examples, an example processor may perform one or more additional or alternative prediction-based operations. For example, example prediction-based operations in accordance with some embodiments of the present disclosure may include, but are not limited to, automated alerts, automated instructions to insulin delivery devices, automated adjustments to medical equipment, automated adjustments to allocations of medical, computing, hospital, facility, and/or human resources. Further, such prediction-based operations may include automated physician notification actions, automated patient notification actions, automated appointment scheduling actions, automated prescription recommendation actions, automated drug prescription generation actions, automated implementation of precautionary actions, automated record updating actions, automated datastore updating actions, automated hospital preparation actions, automated workforce management operational management actions, automated server load balancing actions, automated resource allocation actions, automated call center preparation actions, automated hospital preparation actions, automated pricing actions, automated plan update actions, automated alert generation actions, generating a diagnostic report, generating action scripts, generating one or more electronic communications, and/or the like. In some embodiments, the one or more prediction-based operations may further include displaying visual renderings of the aforementioned examples of prediction-based actions in addition to values, charts, and representations associated with the one or more policy scores and the prediction output using a prediction output user interface.

Subsequent to and/or in response to step/operation 414, some example methods in accordance with some embodiments of the present disclosure proceed to step/operation 416 and end.

Figure 5:
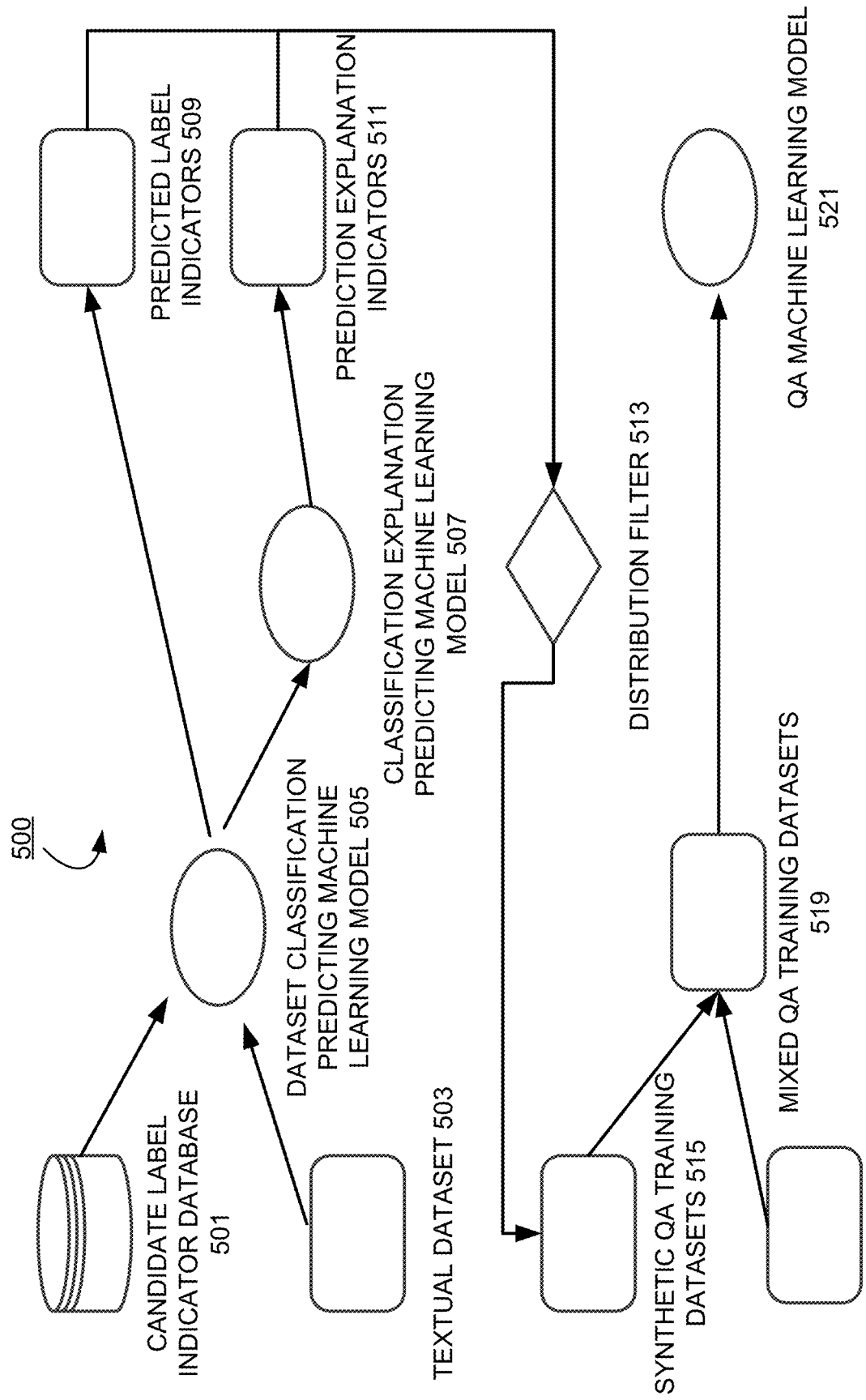
FIG. 5 is an example block diagram of an example method for improving accuracy and precision of QA machine learning models in generating predictions by training the QA machine learning models in accordance with some embodiments discussed herein.

FIG. 5 is an example block diagram of an example method 500 for improving accuracy and reliability of QA machine learning models in generating predictions by training the QA machine learning models in accordance with some embodiments discussed herein.

In some embodiments, the example method 500 includes, but not limited to, performing document classification. For example, the example method 500 may process a textual dataset 503 (for example, an input document) with a dataset classification predicting machine learning model 505 to associate the textual dataset 503 with one or more predicted label indicators 509 based on the candidate label indicators from the candidate label indicator database 501.

In some embodiments, the example method 500 includes, but not limited to, generating explanations of the one or more predicted label indicators 509. For example, the example method 500 may implement a classification explanation predicting machine learning model 507 to generate prediction explanation indicators 511 associated with the predicted label indicators 509.

In some embodiments, the example method 500 includes, but not limited to, implementing a distribution filter 513 on the prediction explanation indicators 511 and the predicted label indicators 509 based on the prediction score indicators. For example, the example method 500 may only select one or more pairs of prediction explanation indicators 511 and the predicted label indicators 509 if the associated prediction score indicators satisfy a prediction score threshold, additional details of which are described herein. In some embodiments, the example method 500 includes, but not limited to, generating the synthetic QA training datasets 515 based on the selected pairs of predicted label indicators and prediction explanation indicators.

In some embodiments, the example method 500 includes, but not limited to, implementing a combine and shuffle operation to combine the synthetic QA training datasets 515 with the human-annotated QA training datasets 517 to generate the mixed QA training datasets 519. In some embodiments, the example method 500 includes, but not limited to, training the QA machine learning model 521 based on the mixed QA training datasets 519.

A. Example Predicted Label Indicator Generation

Figure 6:
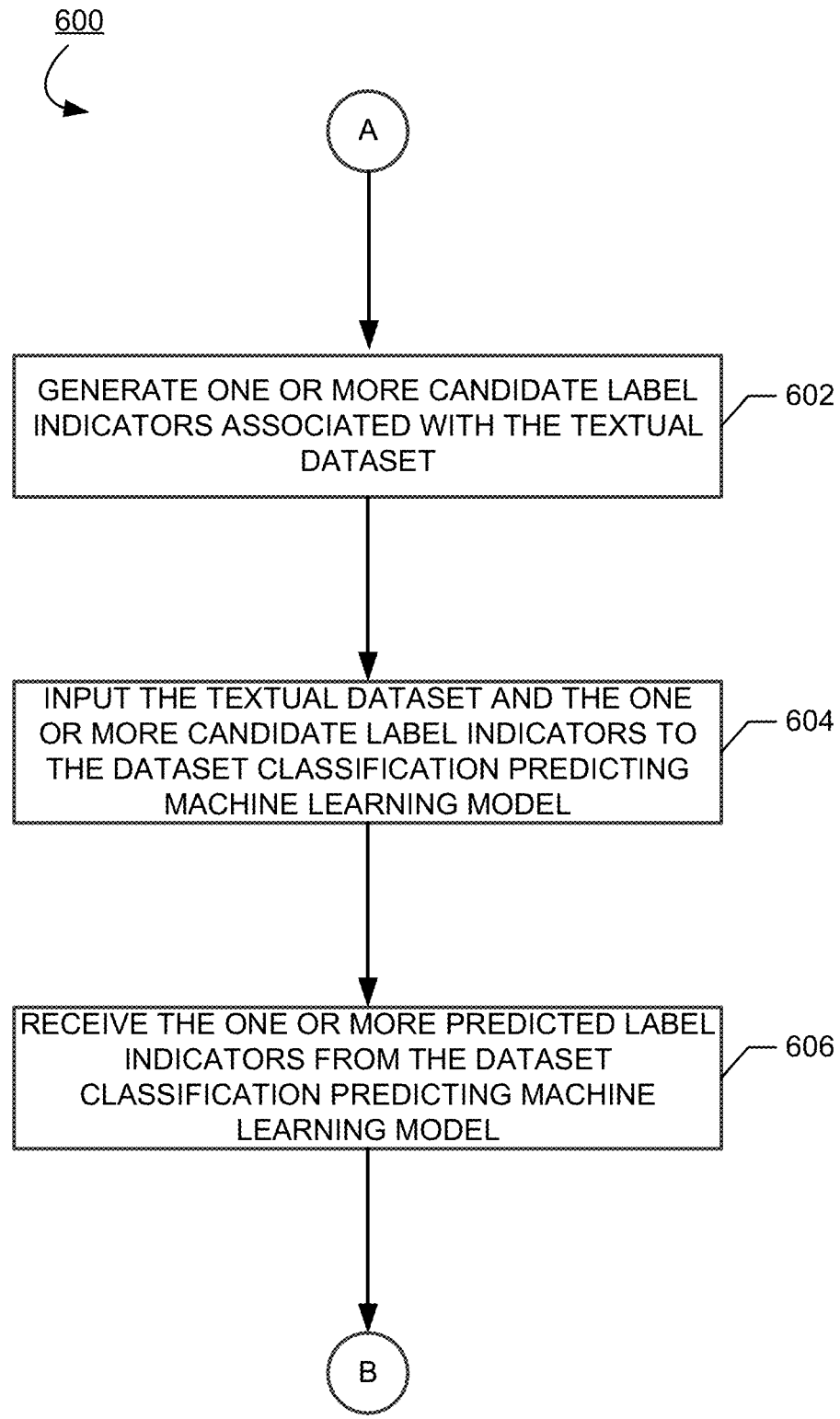
FIG. 6 is an example flowchart diagram of an example method for generating predicted label indicators in accordance with some embodiments discussed herein.

FIG. 6 is an example flowchart diagram of an example method for generating one or more predicted label indicators in accordance with some embodiments discussed herein.

As described above, there are technical challenges, deficiencies, and problems associated with machine learning models, and various example embodiments of the present disclosure overcome such technical challenges, deficiencies, and problems. For example, FIG. 6 illustrates an example flowchart diagram of an example method 600 for improving precision, accuracy, and effectiveness of predictions generated by an example QA machine learning model in accordance with some embodiments discussed herein.

For example, the example method 600 may improve precision and accuracy of QA machine learning model generated predictions by generating predicted label indicators that may be used as synthetic training question indicators of synthetic QA training datasets. In some embodiments, by training an example QA machine learning model based on the synthetic QA training datasets, various embodiments of the present disclosure overcome technical challenges and difficulties associated with training machine learning models due to a lack of high quality QA training datasets.

Referring now to FIG. 6, example methods in accordance with some embodiments of the present disclosure start at block A from step/operation 404 of FIG. 4. Subsequent to and/or in response to block A, some example methods in accordance with some embodiments of the present disclosure proceed to step/operation 602. In some embodiments, a processor (such as, but not limited to, the QA machine learning model computing entity 106 described above in connection with FIG. 1 and FIG. 2) generates one or more candidate label indicators associated with the textual dataset at step/operation 602.

In some embodiments, the processor generates one or more candidate label indicators associated with the textual dataset. As described above, each candidate label indicator indicates a label indicator that is potentially or probably associated with or applicable to a set of textual datasets.

In some embodiments, the processor may derive candidate label indicators from a set of textual datasets based on inputting the set of textual datasets to a machine learning model (such as, but not limited to, clustering based machine learning models, rule based machine learning models, and/or the like) that analyzes occurrence frequencies of concepts in the set of textual datasets to determine candidate label indicators associated with the set of textual datasets. In some embodiments, the processor may determine one or more candidate label indicators based on users inputs. In some embodiments, the processor may determine one or more candidate label indicators may be determined and/or defined through other ways.

In some embodiments, the processor may generate fifty candidate label indicators associated with the textual dataset. Additionally, or alternatively, the processor may generate less than fifty or more than fifty candidate label indicators associated with the textual dataset.

Subsequent to and/or in response to step/operation 602, some example methods in accordance with some embodiments of the present disclosure proceed to step/operation 604. In some embodiments, a processor (such as, but not limited to, the QA machine learning model computing entity 106 described above in connection with FIG. 1 and FIG. 2) inputs a textual dataset and the one or more candidate label indicators to the dataset classification predicting machine learning model at step/operation 604.

In some embodiments, the processor inputs the textual dataset (for example, the textual dataset described above in connection with at least step/operation 404 of FIG. 4) and the one or more candidate label indicators (for example, the one or more candidate label indicators generated at step/operation 602) to one or more dataset classification predicting machine learning models. Examples of dataset classification predicting machine learning models in accordance with some embodiments of the present disclosure may include, but not limited to, SVMs, decision trees, random forest, CNNs, RNNs, and/or the like.

While the description above provides examples of an example dataset classification predicting machine learning model, it is noted that the scope of the present disclosure is not limited to the description above. In some examples, an example dataset classification predicting machine learning model may comprise one or more additional and/or machine learning models.

Subsequent to and/or in response to step/operation 604, some example methods in accordance with some embodiments of the present disclosure proceed to step/operation 606. In some embodiments, a processor (such as, but not limited to, the QA machine learning model computing entity 106 described above in connection with FIG. 1 and FIG. 2) receives the one or more predicted label indicators from the dataset classification predicting machine learning model at step/operation 606.

As described above, the dataset classification predicting machine learning model may generate one or more predicted label indicators associated with the one or more textual datasets based on predicting whether one or more candidate label indicators are associated with the one or more textual datasets. In some embodiments, the outputs from the one or more dataset classification predicting machine learning models may include, but are not limited to, a predicted probability indicator that each candidate label indicators (for example, the one or more candidate label indicators generated at step/operation 602) is associated with or applicable to the textual dataset. In some embodiments, the processor compares the predicted probability indicator with a probability threshold. If the predicted probability indicator satisfies the probability threshold, the processor generates a predicted label indicator based on the candidate label indicator, indicating that the candidate label indicator is predicted to be associated with the textual dataset. If the predicted probability indicator does not satisfy the probability threshold, the processor determines that the candidate label indicator is not predicted to be associated with the textual dataset.

In some embodiments, the one or more predicted label indicators comprise one or more binary classification label indicators. As an example in the healthcare context, the one or more predicted label indicators may indicate a predicted presence or a predicted absence associated with a medical condition described in the textual dataset (for example, in an EHR).

Subsequent to and/or in response to step/operation 606, some example methods in accordance with some embodiments of the present disclosure proceed to block B, which returns to step/operation 404 of FIG. 4.

B. Example Prediction Explanation Indicator And Prediction Score Indicator Generation FIG. 7 is an example flowchart diagram of an example method for generating one or more prediction score indicators in accordance with some embodiments discussed herein.

As described above, there are technical challenges, deficiencies, and problems associated with machine learning models, and various example embodiments of the present disclosure overcome such technical challenges, deficiencies, and problems. For example, FIG. 7 illustrates an example flowchart diagram of an example method 700 for improving precision, accuracy, and effectiveness of predictions generated by an example QA machine learning model in accordance with some embodiments discussed herein.

For example, the example method 700 may improve accuracy and reliability of QA machine learning model generated predictions by generating prediction score indicators for prediction explanation indicators that may be used as synthetic training answer indicators of synthetic QA training datasets. In some embodiments, by training an example QA machine learning model based on the synthetic QA training datasets, various embodiments of the present disclosure overcome technical challenges and difficulties associated with training machine learning models due to a lack of high quality QA training datasets.

Figure 7:
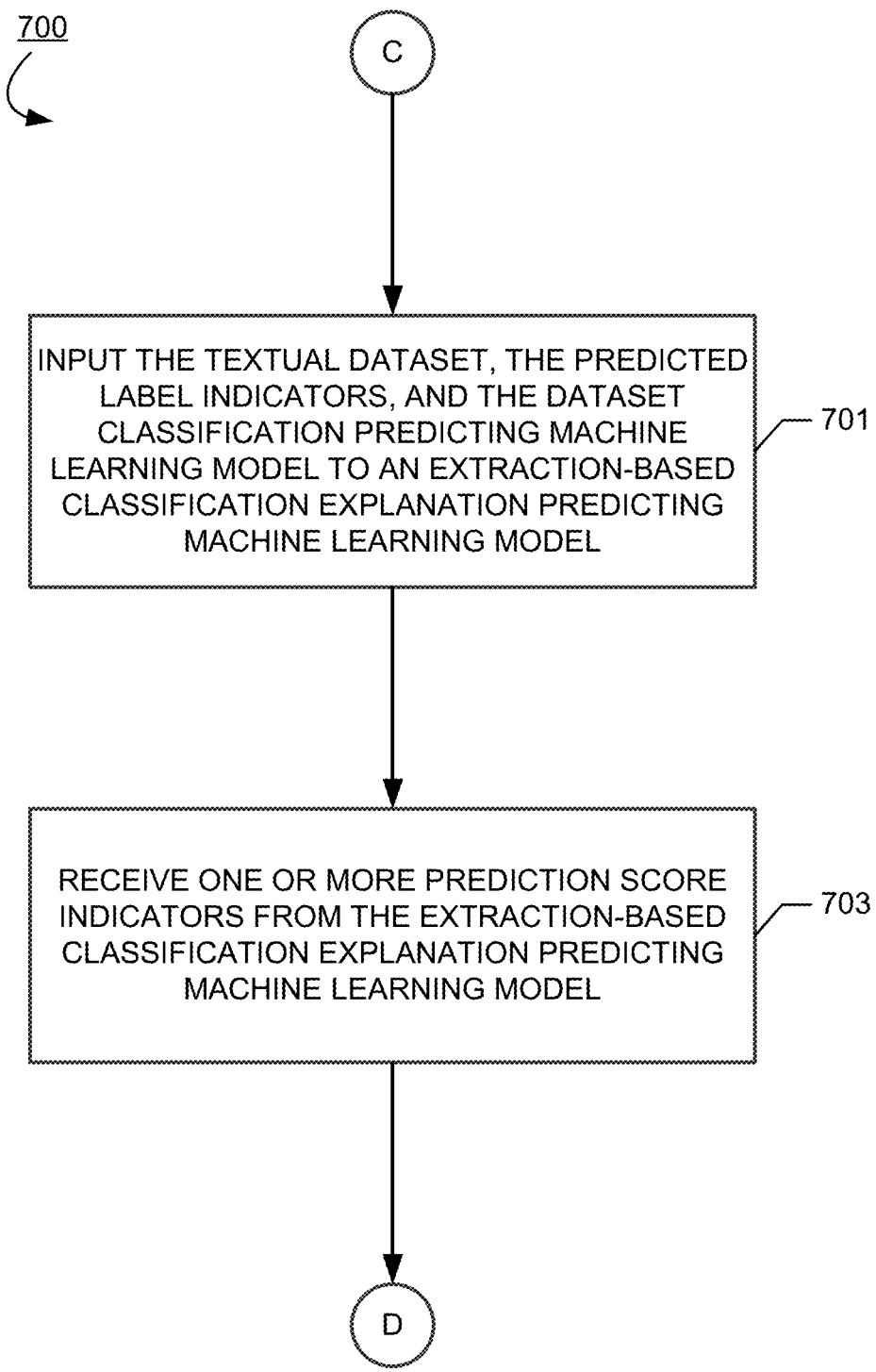
FIG. 7 is an example flowchart diagram of an example method for generating prediction score indicators in accordance with some embodiments discussed herein.

Referring now to FIG. 7, example methods in accordance with some embodiments of the present disclosure start at block C, which is connected from step/operation 406 of FIG. 4. Subsequent to and/or in response to block C, some example methods in accordance with some embodiments of the present disclosure proceed to step/operation 701. In some embodiments, a processor (such as, but not limited to, the QA machine learning model computing entity 106 described above in connection with FIG. 1 and FIG. 2) inputs the textual dataset, the predicted label indicators, and the dataset classification predicting machine learning model to an extraction-based classification explanation predicting machine learning model at step/operation 701.

As described above, an example classification explanation predicting machine learning model may comprise an extraction-based classification explanation predicting machine learning model. In such examples, the extraction-based classification explanation predicting machine learning model receives inputs that include (a) the textual dataset that was also input into the dataset classification predicting machine learning model, (b) the one or more predicted label indicators generated by the dataset classification predicting machine learning model, and (c) the dataset classification predicting machine learning model.

While the description above provides an example classification explanation predicting machine learning model in the form of an example extraction-based classification explanation predicting machine learning model, it is noted that the scope of the present disclosure is not limited to the description above. In some examples, an example classification explanation predicting machine learning model may comprise one or more additional and/or alternative machine learning models.

Subsequent to and/or in response to step/operation 701, some example methods in accordance with some embodiments of the present disclosure proceed to step/operation 703. In some embodiments, a processor (such as, but not limited to, the QA machine learning model computing entity 106 described above in connection with FIG. 1 and FIG. 2) receives one or more prediction score indicators from the extraction-based classification explanation predicting machine learning model at step/operation 703.

In some embodiments, the extraction-based classification explanation predicting machine learning model generates one or more prediction explanation indicators that comprise one or more textual subsets associated with the textual dataset, similar to the various examples described above. In some embodiments, the processor may receive one or more prediction score indicators from the extraction-based classification explanation predicting machine learning model. In some embodiments, each of the one or more prediction score indicators is associated with one of the one or more prediction explanation indicators and is associated with one of the one or more predicted label indicators.

For example, each of the one or more prediction score indicators may indicate a predicted importance level of each textual subsets (for example, each sentence of a document) in causing the dataset classification predicting machine learning model to generate a predicted label indicator. In such an example, the higher the prediction score indicator, the more important that the textual subset is to the dataset classification predicting machine learning model for generating the predicted label indicator. The lower the prediction score indicator, the less important that the textual subset is to the dataset classification predicting machine learning model for generating the predicted label indicator. In some embodiments, each textual subsets is associated with a prediction score indicator corresponding to each of the one or more predicted label indicators.

In some embodiments, the prediction score indicator may be on a scale from −1 to 1. In some embodiments, other scales may be implemented for the prediction score indicator.

Subsequent to and/or in response to step/operation 703, some example methods in accordance with some embodiments of the present disclosure proceed to block D, which returns to step/operation 406 of FIG. 4.

C. Example Structured Label-Explanation Datasets And Synthetic QA Training Datasets Generation FIG. 8 is an example block diagram of an example structured label-explanation dataset 800 in accordance with some embodiments discussed herein. In the example shown in FIG. 8, the example structured label-explanation dataset 800 comprises an example label-explanation matrix dataset.

In some embodiments, the example label-explanation matrix dataset is in a tabular format that indicates data colorations between a predicted label indicator of one or more predicted label indicators (for example, columns in the tabular format), a prediction explanation indicator of one or more prediction explanation indicators (for example, rows in the tabular format), and a prediction score indicator of one or more prediction score indicators (for example, cells in the tabular format).

In some embodiments, the prediction score indicator indicates a predicted importance level associated with the prediction explanation indicator in generating the predicted label indicator for the textual dataset.

For example, the prediction score indicator 806A may indicate a predicted importance level associated with the prediction explanation indicator 804A in generating the predicted label indicator 802A for the textual dataset. The prediction score indicator 806B may indicate a predicted importance level associated with the prediction explanation indicator 804A in generating the predicted label indicator 802B for the textual dataset. The prediction score indicator 806C may indicate a predicted importance level associated with the prediction explanation indicator 804A in generating the predicted label indicator 802C for the textual dataset. The prediction score indicator 806D may indicate a predicted importance level associated with the prediction explanation indicator 804B in generating the predicted label indicator 802A for the textual dataset. The prediction score indicator 806E may indicate a predicted importance level associated with the prediction explanation indicator 804B in generating the predicted label indicator 802B for the textual dataset. The prediction score indicator 806F may indicate a predicted importance level associated with the prediction explanation indicator 804B in generating the predicted label indicator 802C for the textual dataset. The prediction score indicator 806G may indicate a predicted importance level associated with the prediction explanation indicator 804C in generating the predicted label indicator 802A for the textual dataset. The prediction score indicator 806H may indicate a predicted importance level associated with the prediction explanation indicator 804C in generating the predicted label indicator 802B for the textual dataset. The prediction score indicator 806I may indicate a predicted importance level associated with the prediction explanation indicator 804C in generating the predicted label indicator 802C for the textual dataset. The prediction score indicator 806J may indicate a predicted importance level associated with the prediction explanation indicator 804D in generating the predicted label indicator 802A for the textual dataset. The prediction score indicator 806K may indicate a predicted importance level associated with the prediction explanation indicator 804D in generating the predicted label indicator 802B for the textual dataset. The prediction score indicator 806L may indicate a predicted importance level associated with the prediction explanation indicator 804D in generating the predicted label indicator 802C for the textual dataset.

In accordance with various embodiments of the present disclosure, synthetic QA training datasets may be generated based on example structured label-explanation datasets.

Figure 9:
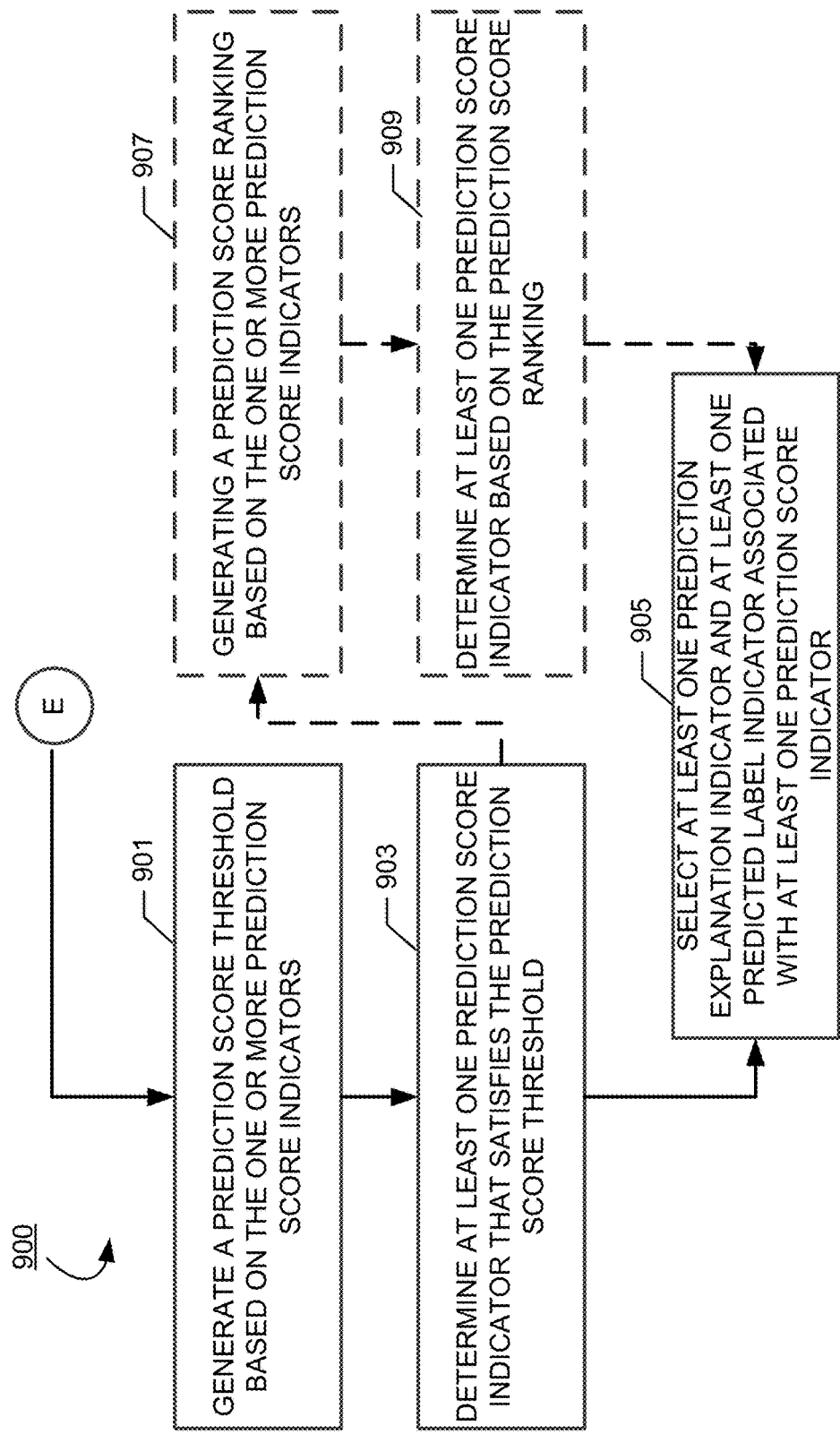
FIG. 9 is an example flowchart diagram of an example method for generating synthetic QA training datasets in accordance with some embodiments discussed herein.

FIG. 9 is an example flowchart diagram of an example method for generating synthetic QA training datasets in accordance with some embodiments discussed herein.

As described above, there are technical challenges, deficiencies, and problems associated with machine learning models, and various example embodiments of the present disclosure overcome such technical challenges, deficiencies, and problems. For example, FIG. 9 illustrates an example flowchart diagram of an example method 900 for improving precision, accuracy, and effectiveness of predictions generated by an example QA machine learning model in accordance with some embodiments discussed herein.

For example, the example method 900 may improve accuracy and reliability of machine learning model generated predictions by selecting one or more prediction explanation indicators that are associated with prediction score indicators satisfying the prediction score thresholds. In some embodiments, the prediction explanation indicators associated with such prediction explanation indicators may be used as synthetic training answer indicators of synthetic QA training datasets. In some embodiments, by training an example QA machine learning model based on the synthetic QA training datasets, various embodiments of the present disclosure overcome technical challenges and difficulties associated with training machine learning models due to a lack of high quality QA training dataset.

Referring now to FIG. 9, example methods in accordance with some embodiments of the present disclosure start at block E, which is connected to step/operation 410 of FIG. 4. Subsequent to and/or in response to block E, some example methods in accordance with some embodiments of the present disclosure proceed to step/operation 901. In some embodiments, a processor (such as, but not limited to, the QA machine learning model computing entity 106 described above in connection with FIG. 1 and FIG. 2) generates a prediction score threshold based on the one or more prediction score indicators at step/operation 901.

Figure 10:
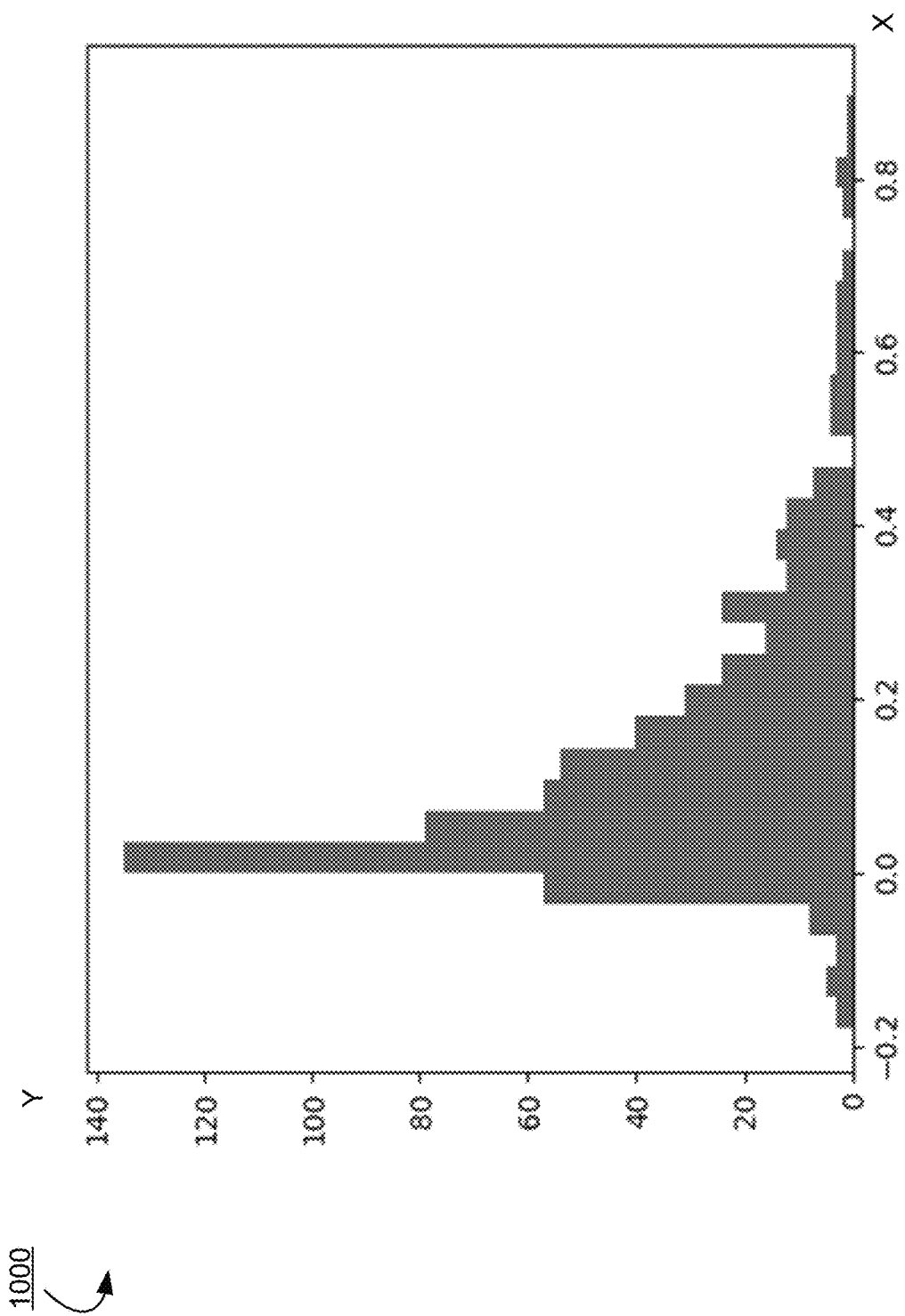
FIG. 10 is an example distribution diagram of example prediction score indicators in accordance with some embodiments discussed herein.

In some embodiments, the processor generates the prediction score threshold based on performing one or more statistical analyses on the one or more prediction score indicators. Referring now to FIG. 10, an example distribution diagram 1000 illustrating statistical distributions of prediction score indicators in accordance with some embodiments of the present disclosure is illustrated.

In the example shown in FIG. 10, the X axis of the example distribution diagram 1000 corresponds to example prediction score indicators associated with a set of prediction explanation indicators generated by an example classification explanation predicting machine learning model (such as, but not limited to, an example extraction-based classification explanation predicting machine learning model), and the Y axis of the example distribution diagram 1000 corresponds to the distribution frequency (for example, on a scale from 0 to 140) associated with each value of the example prediction score indicators.

As an example, an example extraction-based classification explanation predicting machine learning model may generate a plurality of prediction explanation indicators that comprise sentence-level explanations based on extracting sentences from the textual dataset, and may generate prediction score indicators that indicate how informative each sentence-level explanation is to the dataset classification predicting machine learning model in generating a predicted label indicator. To generate high quality QA training datasets, various embodiments of the present disclosure may set a prediction score threshold that indicates a threshold importance level of a sentence-level explanation.

In some embodiments, the prediction score threshold corresponds to a sample mean of the one or more prediction score indicators plus two standard deviations associated with the one or more prediction score indicators. As illustrated in the example shown in FIG. 10, an example distribution of prediction score indicators from an extraction-based classification explanation predicting machine learning model may follow an exponential distribution that is parameterized by lambda. In such an example, the lambda equals one over the sample mean of the one or more prediction score indicators, and the standard deviation is one over lambda. Continuing this example, example embodiments of the present disclosure may set a threshold to filter the score distribution to only pairs of predicted label indicators and prediction explanation indicators with prediction score indicators exceeding the sample mean plus two standard deviations, which can provide technical benefits and advantages such as, but not limited to, improving precision and accuracy in predictions generated by the QA machine learning models.

While the description above provides an example of generating the prediction score threshold, it is noted that the scope of the present disclosure is not limited to the description above. In some examples, an example processor may generate the prediction score threshold through one or more additional or alternative ways.

Subsequent to and/or in response to step/operation 901, some example methods in accordance with some embodiments of the present disclosure proceed to step/operation 903. In some embodiments, a processor (such as, but not limited to, the QA machine learning model computing entity 106 described above in connection with FIG. 1 and FIG. 2) determines at least one prediction score indicator that satisfies the prediction score threshold at step/operation 903.

As described above, each prediction score indicator indicates a predicted importance level associated with the at least one prediction explanation indicator in generating the at least one predicted label indicator for the textual dataset. In some embodiments, the processor compares each prediction score indicator with the prediction score threshold generated at step/operation 901, and determines whether the prediction score indicator satisfies the prediction score threshold. For example, if the prediction score indicator is more than the prediction score threshold, the processor determines that prediction score indicator satisfies the prediction score threshold. If the prediction score indicator is not more than the prediction score threshold, the processor determines that prediction score indicator does not satisfy the prediction score threshold.

As an example in connection with FIG. 8 described above, the processor may compare each of the prediction score indicator 806A, the prediction score indicator 806B, the prediction score indicator 806C, the prediction score indicator 806D, the prediction score indicator 806E, the prediction score indicator 806F, the prediction score indicator 806G, the prediction score indicator 806H, the prediction score indicator 806I, the prediction score indicator 806J, the prediction score indicator 806K, and the prediction score indicator 806L with the prediction score threshold generated at step/operation 901, and may determine that the prediction score indicator 806A, the prediction score indicator 806B, the prediction score indicator 806F, the prediction score indicator 806G, and the prediction score indicator 806L satisfy the prediction score threshold.

Subsequent to and/or in response to step/operation 903, some example methods in accordance with some embodiments of the present disclosure proceed to step/operation 905. In some embodiments, a processor (such as, but not limited to, the QA machine learning model computing entity 106 described above in connection with FIG. 1 and FIG. 2) selects at least one prediction explanation indicator and at least one predicted label indicator associated with at least one prediction score indicator at step/operation 905.

In some embodiments, the processor selects the at least one prediction explanation indicator and at least one predicted label indicator that are associated with at least one prediction score indicator satisfying the prediction score threshold described above in connection with at least step/operation 903. For example, the processor may select a subset of pairs of predicted label indicators and prediction explanation indicators in which the associated prediction explanation indicators are above the prediction score threshold for further processing.

In some embodiments, the processor may select more than one prediction explanation indicator of one predicted label indicator. For example, the processor may select multiple prediction explanation indicators as explanations for a single predicted label indicator if, for example, the prediction score indicators associated with each prediction explanation indicator exceed the prediction score threshold.

Continuing from an example in connection with FIG. 8 described above, the processor may select the pair of the predicted label indicator 802A and the prediction explanation indicator 804A that is associated with the prediction score indicator 806A satisfying the prediction score threshold, the pair of the predicted label indicator 802A and the prediction explanation indicator 804C that is associated with the prediction score indicator 806G satisfying the prediction score threshold, the pair of the predicted label indicator 802B and the prediction explanation indicator 804A that is associated with the prediction score indicator 806B satisfying the prediction score threshold, the pair of the predicted label indicator 802B and the prediction explanation indicator 804D that is associated with the prediction score indicator 806K satisfying the prediction score threshold, and the pair of the predicted label indicator 802C and the prediction explanation indicator 804B that is associated with the prediction score indicator 806F satisfying the prediction score threshold.

Subsequent to and/or in response to step/operation 905, some example methods in accordance with some embodiments of the present disclosure proceed to block F, which is connected to step/operation 410 of FIG. 4.

Figure 11:
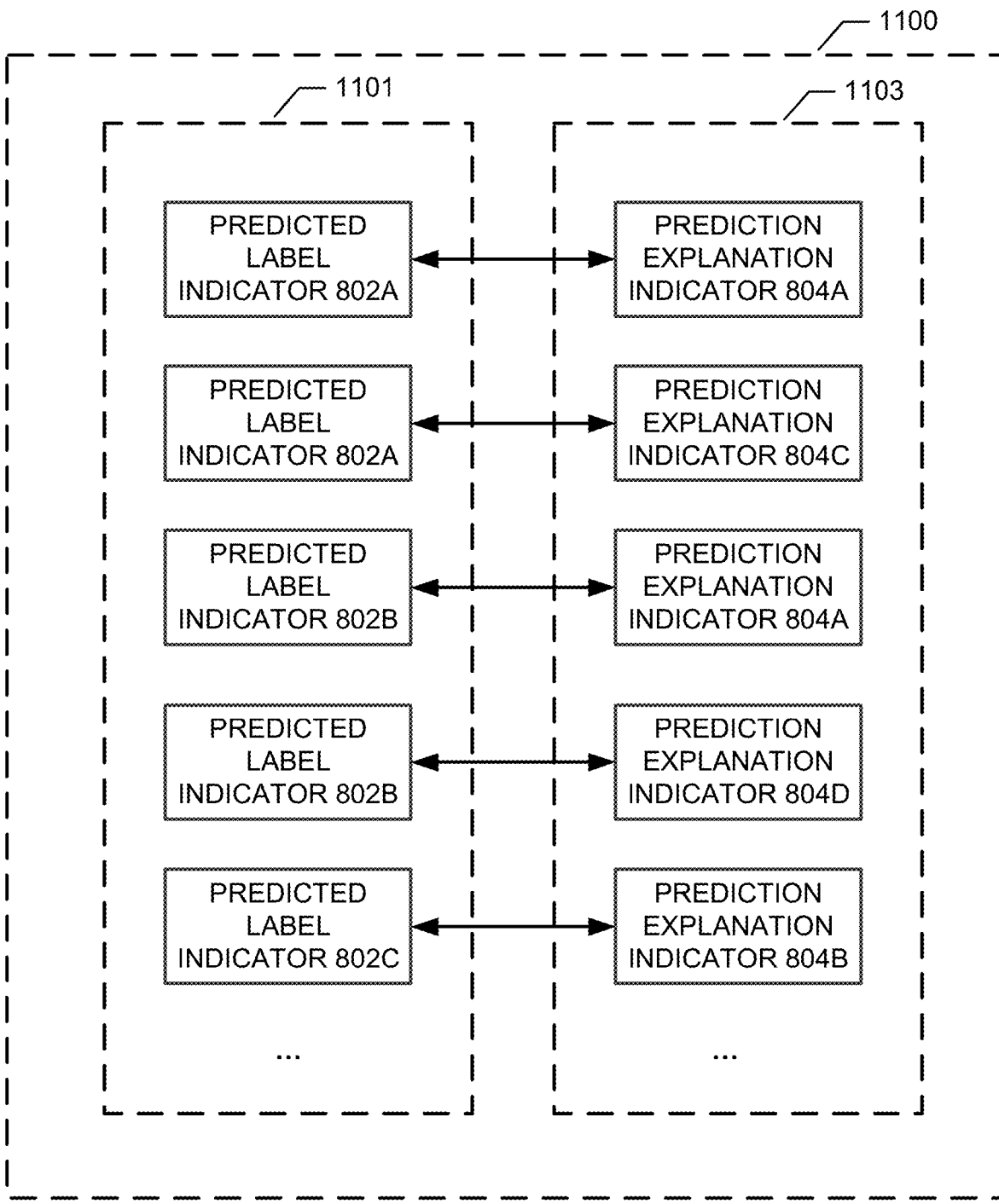
FIG. 11 illustrates an example synthetic QA training dataset in accordance with some embodiments discussed herein.

For example, the processor may generate one or more synthetic QA training datasets. In some embodiments, the processor generates synthetic QA training datasets based on the at least one prediction explanation indicator and at least one predicted label indicator selected at step/operation 905. As described above, the one or more synthetic QA training datasets may comprise one or more synthetic training question indicators associated with one or more synthetic training answer indicators. In some embodiments, each of the one or more synthetic training question indicators comprises at least one predicted label indicator, and each of the one or more synthetic training answer indicators comprises at least one prediction explanation indicator. Referring now to FIG. 11, an example synthetic QA training dataset 1100 in accordance with some embodiments discussed herein is illustrated.

In the example shown in FIG. 11, the example synthetic QA training dataset 1100 comprises a plurality of synthetic training question indicators 1101 and a plurality of synthetic training answer indicators 1103. In some embodiments, each of the plurality of synthetic training question indicators 1101 corresponds to one of the predicted label indicators that is selected at step/operation 905, and each of the plurality of synthetic training answer indicators 1103 corresponds to one of the prediction explanation indicators that is selected at step/operation 905. For example, the example synthetic QA training dataset 1100 may comprise the pair of the predicted label indicator 802A and the prediction explanation indicator 804A, the pair of the predicted label indicator 802A and the prediction explanation indicator 804C, the pair of the predicted label indicator 802B and the prediction explanation indicator 804A, the pair of the predicted label indicator 802B and the prediction explanation indicator 804D, and the pair of the predicted label indicator 802C and the prediction explanation indicator 804B.

Optionally, in some embodiments, subsequent to and/or in response to step/operation 903, some example methods in accordance with some embodiments of the present disclosure proceed to step/operation 907. In some embodiments, a processor (such as, but not limited to, the QA machine learning model computing entity 106 described above in connection with FIG. 1 and FIG. 2) generates a prediction score ranking based on the one or more prediction score indicators at step/operation 907.

As described above, there may be multiple prediction explanation indicators for a single predicted label indicator that are associated with prediction explanation indicators exceeding the prediction score threshold. In some embodiments, the processor may reduce the number of prediction explanation indicators selected for each predicted label indicator based on a prediction score ranking.

For example, the processor may generate a prediction score ranking based on ranking the prediction score indicators from high to low, and may rank the prediction explanation indicators based on the prediction score ranking.

Continuing from the example in connection with FIG. 8, the processor may rank the prediction score indicators associated with the predicted label indicator 802A that include, but not limited to, the prediction score indicator 806A, the prediction score indicator 806D, the prediction score indicator 806G, and the prediction score indicator 806J. As an example, the prediction score ranking may indicate that the prediction score indicator 806A is the highest, followed by the prediction score indicator 806G, followed by the prediction score indicator 806D, and followed by the prediction score indicator 806J.

Subsequent to and/or in response to step/operation 907, some example methods in accordance with some embodiments of the present disclosure proceed to step/operation 909. In some embodiments, a processor (such as, but not limited to, the QA machine learning model computing entity 106 described above in connection with FIG. 1 and FIG. 2) determines at least one prediction score indicator based on the prediction score ranking at step/operation 909.

For example, the processor may determine one or more prediction score indicators based on selecting a top K number of prediction score indicators from the prediction score ranking.

Continuing from the example in connection with FIG. 8 above, the processor may select a top two of prediction score indicators based on the prediction score ranking. In such an example, the processor may select the prediction score indicator 806A and the prediction score indicator 806G.

Subsequent to and/or in response to step/operation 909, some example methods in accordance with some embodiments of the present disclosure proceed to step/operation 905. In some embodiments, a processor (such as, but not limited to, the QA machine learning model computing entity 106 described above in connection with FIG. 1 and FIG. 2) selects at least one prediction explanation indicator and at least one predicted label indicator associated with at least one prediction score indicator at step/operation 905.

In some embodiments, the processor may select one or more pairs of prediction explanation indicators and predicted label indicators that are associated with prediction score indicators determined above in connection with at least step/operation 909.

Continuing from the example in connection with FIG. 8 above, the processor may select the pair of the predicted label indicator 802A and the prediction explanation indicator 804A that is associated with the prediction score indicator 806A, and the pair of the predicted label indicator 802A and the prediction explanation indicator 804C that is associated with the prediction score indicator 806G.

Subsequent to and/or in response to step/operation 905, some example methods in accordance with some embodiments of the present disclosure proceed to block F, which is connected to step/operation 410 of FIG. 4.

For example, the processor may generate one or more synthetic QA training datasets based on the at least one prediction explanation indicator and at least one predicted label indicator selected at step/operation 905.

Continuing from the example in connection with FIG. 8 above, the processor may generate synthetic QA training datasets that include the pair of the predicted label indicator 802A and the prediction explanation indicator 804A, and the pair of the predicted label indicator 802A and the prediction explanation indicator 804C.

Referring now to TABLE 1 below, example synthetic QA training datasets that comprise example synthetic training question indicators and example synthetic training answer indicators in accordance with some embodiments of the present disclosure are illustrated:

TABLE 1

EXAMPLE SYNTHETIC QA TRAINING DATASETS

| Synthetic Training Question Indicator | Synthetic Training Answer Indicator |
|---|---|
| Pure hypercholesterolemia? | Hypercholesterolemia |
| Severe sepsis? | colectomy/Hartmann's procedure [\*\*2187-7-6\*\*] c/b septic shock, renal |
| Unspecified hypothyroidism? | Hypothyroidism. |
| Unspecified essential hypertension? | CAD, HTN, dyslipidemia, coronary stent (unknown date/location) |
| Coronary atherosclerosis of native coronary artery? | single vessel CAD |
| Urinary tract infection, site not specified? | #UTI: Ms. [\*\*Known lastname 12167\*\*] complained of dysuria on admission. |
| Unspecified essential hypertension? | PMHx: HTN, gout, fatty liver, hypercholesterolemia, kidney |
| Extracorporeal circulation auxiliary to open heart surgery? | [\*\*2127-6-20\*\*] CABG ×2 (LIMA to LAD, SVG to OM) |
| Pure hypercholesterolemia? | hypertension, hypercholesterolemia, multiple falls, renal |
| Esophageal reflux? | -GERD |

While the description above provides example synthetic QA training datasets, it is noted that the scope of the present disclosure is not limited to the description above. In some examples, an example synthetic QA training datasets may comprise one or more additional and/or alternative elements.

D. Example Trained QA Machine Learning Models Generation

Figure 12:
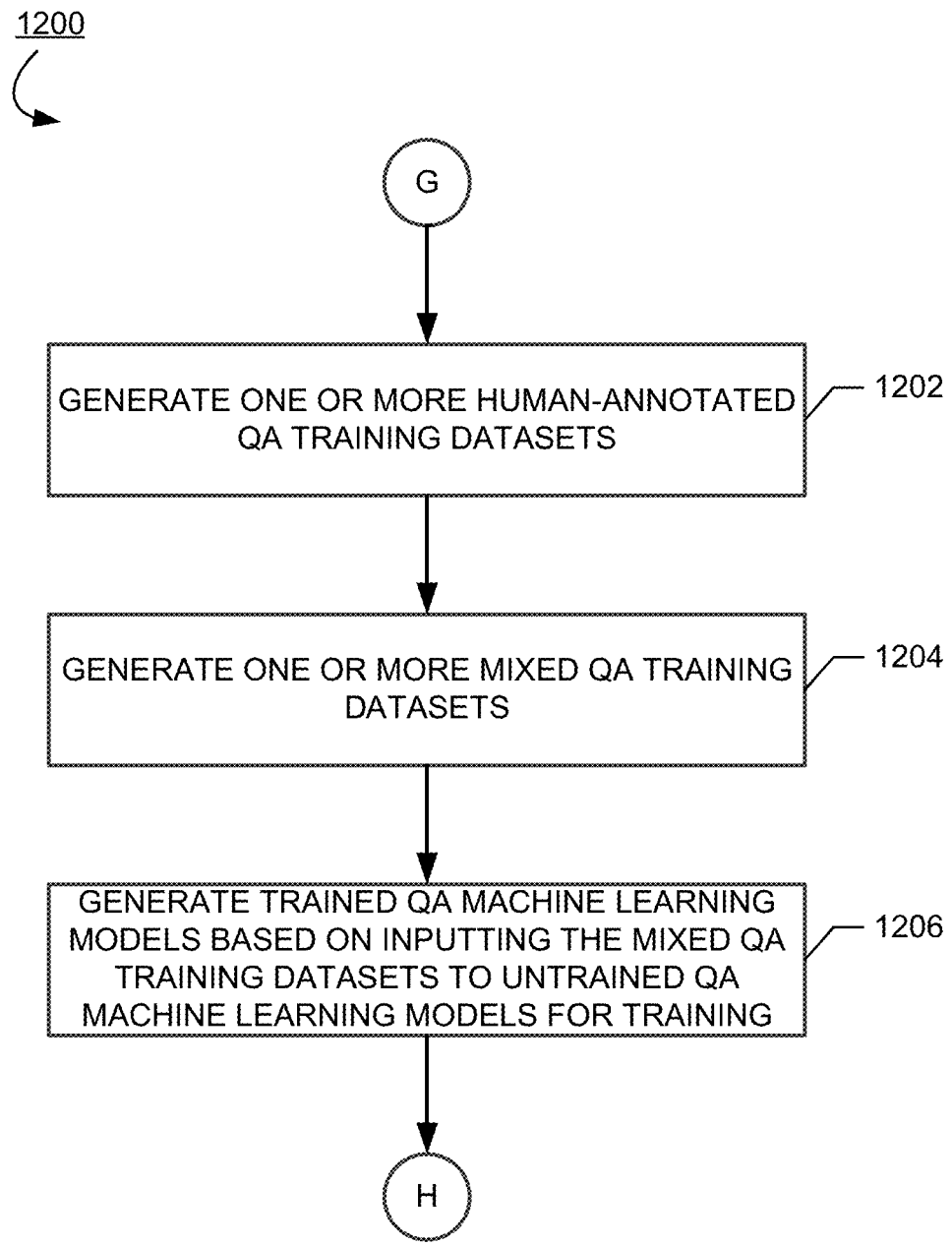
FIG. 12 is an example flowchart diagram of an example method for generating trained QA machine learning models in accordance with some embodiments discussed herein.

FIG. 12 is an example flowchart diagram of an example method for generating trained QA machine learning models in accordance with some embodiments discussed herein.

As described above, there are technical challenges, deficiencies, and problems associated with machine learning models, and various example embodiments of the present disclosure overcome such technical challenges, deficiencies, and problems. For example, FIG. 12 illustrates an example flowchart diagram of an example method 1200 for improving precision, accuracy, and effectiveness of predicting answer indicators by an example QA machine learning model in accordance with some embodiments discussed herein.

For example, the example method 1200 may improve accuracy and reliability of machine learning model generated predictions by training the QA machine learning model based on a mixed QA training datasets that not only include the human-annotated QA training datasets, but also synthetic QA training datasets. In some embodiments, by generating the mixed QA training datasets based on implementing one or more dataset classification predicting machine learning models and one or more classification explanation predicting machine learning models, various embodiments of the present disclosure overcome technical challenges and difficulties associated with training machine learning models due to a lack of high quality QA training datasets.

Referring now to FIG. 12, example methods in accordance with some embodiments of the present disclosure start at block G, which is connected to step/operation 412 of FIG. 4. Subsequent to and/or in response to block G, some example methods in accordance with some embodiments of the present disclosure proceed to step/operation 1202. In some embodiments, a processor (such as, but not limited to, the QA machine learning model computing entity 106 described above in connection with FIG. 1 and FIG. 2) generates one or more human-annotated QA training datasets at step/operation 1202.

In some embodiments, the processor may generate human-annotated QA training datasets based on user inputs from SMEs. In some embodiments, the human-annotated QA training datasets may include, but not limited to, human-created QA pairs and human-verified QA pairs. For example, the processor may generate the human-created QA training datasets based on user inputs from SMEs that include both the training question indicators and the training answer indicators. Additionally, or alternatively, the processor may generate human-verified QA training datasets based on user inputs from SMEs who review and verify other QA training datasets (including, but not limited to, synthetic QA training datasets, human-created QA training datasets, and/or the like).

Subsequent to and/or in response to step/operation 1202, some example methods in accordance with some embodiments of the present disclosure proceed to step/operation 1204. In some embodiments, a processor (such as, but not limited to, the QA machine learning model computing entity 106 described above in connection with FIG. 1 and FIG. 2) generates one or more mixed QA training datasets at step/operation 1204.

In some embodiments, the processor generates the one or more mixed QA training datasets based on the one or more synthetic QA training datasets and the one or more human-annotated QA training datasets.

For example, the processor may shuffle the one or more synthetic QA training datasets and the one or more human-annotated QA training datasets so that they are ordered randomly for training presentation to the QA machine learning model. In such an example, the QA machine learning model is trained without information as to whether QA pairs are synthetic or human-annotated, providing technical benefits and advantages such as, but not limited to, improving precision and accuracy in generating predictions by the QA machine learning models.

While the description above provides an example of generating mixed QA training datasets, it is noted that the scope of the present disclosure is not limited to the description above. In some examples, an example mixed QA training datasets may be generated based on combining the synthetic QA training datasets with other types of QA training datasets.

Subsequent to and/or in response to step/operation 1204, some example methods in accordance with some embodiments of the present disclosure proceed to step/operation 1206. In some embodiments, a processor (such as, but not limited to, the QA machine learning model computing entity 106 described above in connection with FIG. 1 and FIG. 2) generates trained QA machine learning models based on inputting the mixed QA training datasets to untrained QA machine learning models for training at step/operation 1206.

Figure 13:
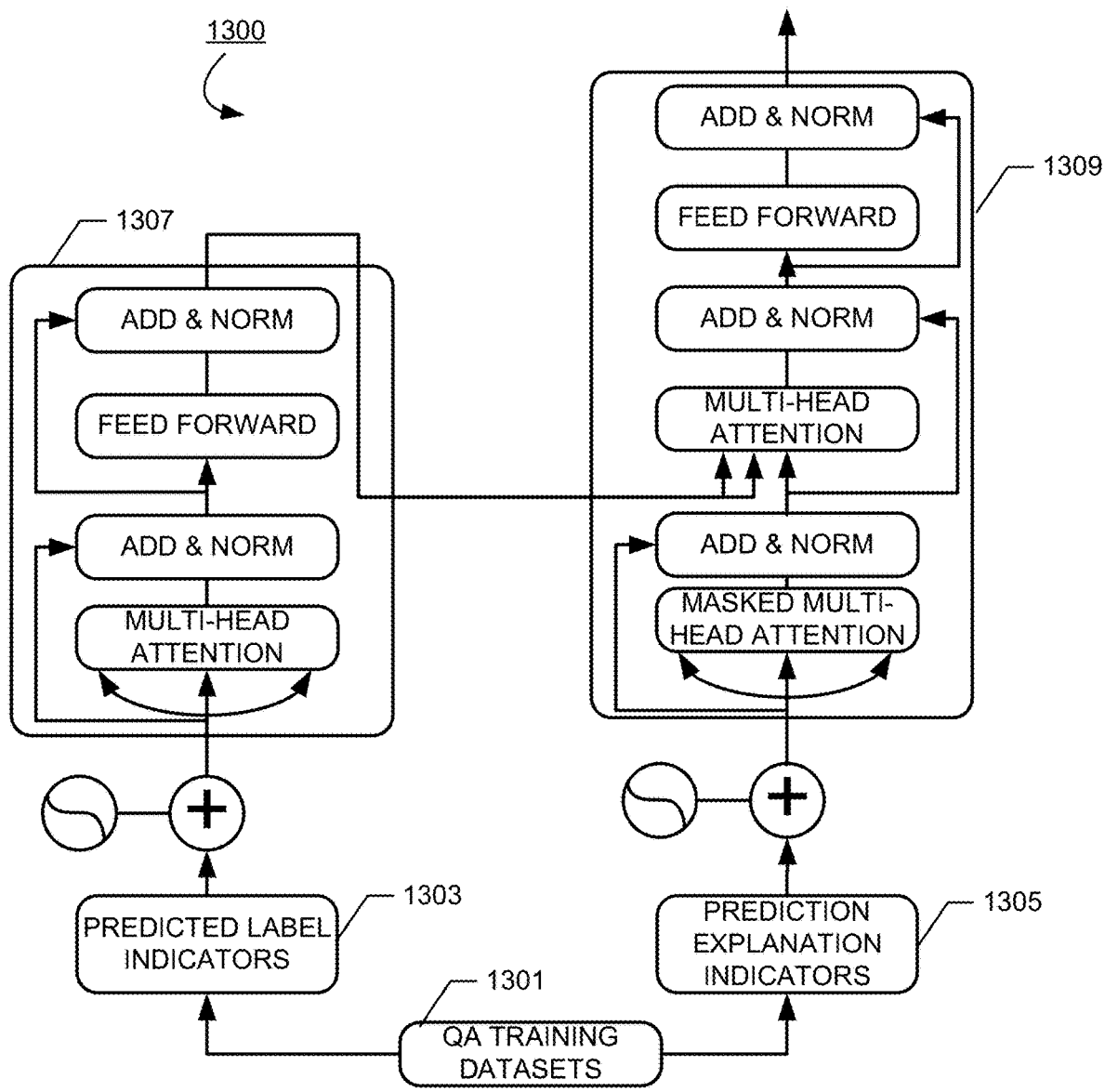
FIG. 13 is an example block diagram of an example method for training example QA machine learning models in accordance with some embodiments discussed herein.

In some embodiments, an example QA machine learning model is trained based on a combination of synthetic QA training datasets and human-annotated QA training datasets. Referring now to FIG. 13, an example block diagram 1300 of for training example QA machine learning models in accordance with some embodiments of the present disclosure is provided.

In the example shown in FIG. 13, the example QA machine learning model may be in the form of BERT. For example, the example QA machine learning model may comprise an encoder component 1307 and a decoder component 1309. In such an example, the encoder component 1307 may process input data (for example, answer indicator prediction requests that comprise one or more questions or queries) and transform input data into encoded representations (for example, vector embeddings). The decoder component 1309 may receive the encoded representations from the encoder component 1307, and may produce a sequence of words or tokens that form a predicted answer indicator.

In some embodiments, each of the encoder component 1307 and the decoder component 1309 may comprise one or more layers. For example, each of the encoder component 1307 and the decoder component 1309 may comprise a multi-head attention layer, a feed forward layer, and one or more add & norm layers. In some embodiments, the multi-head attention layer may utilize a multi-head attention mechanism to perform transformation on the input data to generate one or more attention vectors, the feed forward layer may transform the attention vectors into another form that is suitable for the next layer/transformer, and add & norm layers may follow each of the multi-head attention layer and the feed forward layer to normalize the output from the prior layer.

Various embodiments of the present disclosure may train the QA machine learning model based on the QA training datasets 1301 that is generated in accordance with embodiments of the present disclosure. For example, the QA training datasets 1301 may comprise training question indicators that include, but are not limited to, the predicted label indicators 1303. The QA training datasets 1301 may also comprise training answer indicators that include, but are not limited to, the predicted explanation indicators 1305. During training, the processor may provide the predicted label indicators 1303 to the encoder component 1307 and the predicted explanation indicators 1305 to the decoder component 1309. In such an example, the example QA machine learning model may calculate a loss between the predicted answers that are generated by the example QA machine learning model based on the predicted label indicators 1303 and the predicted explanation indicators 1305. In some embodiments, the example QA machine learning model may backpropagate various parameters associated with the one or more layers of the encoder component 1307 and/or the decoder component 1309 (for example, but not limited to, gradients, model weights, and/or the like) so as to minimize the loss.

While the description above provides an example training of an example QA machine learning model, it is noted that the scope of the present disclosure is not limited to the description above. In some examples, training an example QA machine learning model may comprise one or more additional and/or alternative operations.

Referring back to FIG. 12, subsequent to and/or in response to step/operation 1206, some example methods in accordance with some embodiments of the present disclosure proceed to block H, which is connected to step/operation 412 of FIG. 4.

Figure 14:
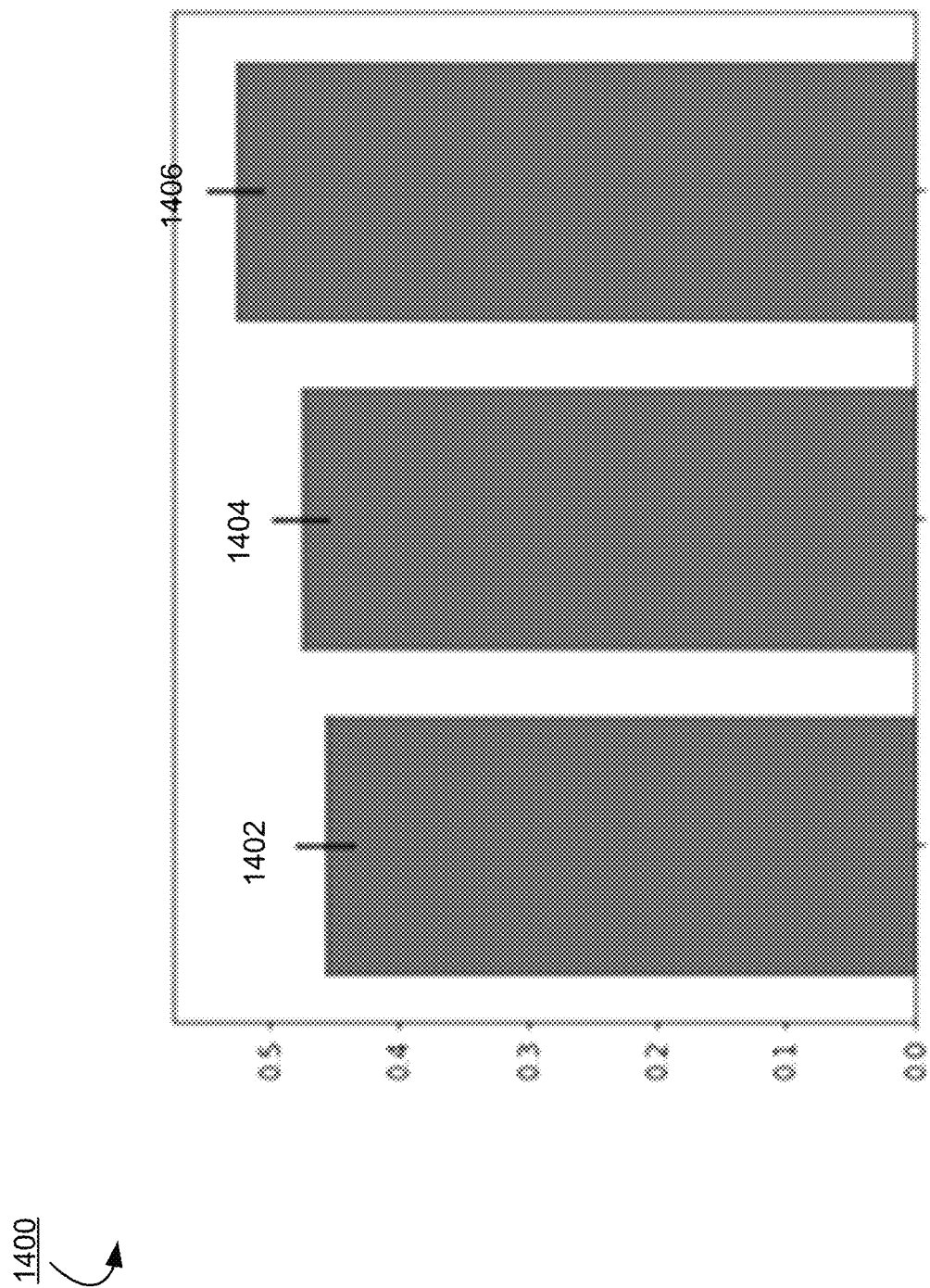
FIG. 14 is an example bar chart illustrating example performances of example QA machine learning models in accordance with some embodiments discussed herein.

Referring now to FIG. 14, an example bar chart 1400 illustrating example performances of example QA machine learning models that are trained in accordance with some embodiments of the present disclosure are illustrated.

In the example shown in FIG. 14, the example bar chart 1400 illustrates example F1 scores associated with QA machine learning models. In particular, the bar 1402 illustrates an example F1 score associated with an QA machine learning model that is not trained based on example synthetic QA training datasets described herein. The bar 1404 illustrates an example F1 score associated with an QA machine learning model that is trained based on example synthetic QA training datasets in accordance with some embodiments of the present disclosure, and the example synthetic QA training datasets comprise predicted label indicators and prediction explanation indicators that are associated with prediction score indicators that are (1) greater than two standard deviations from the mean of the prediction score indicators and (2) is the top one ranked prediction score indicator. The bar 1406 illustrates an example F1 score associated with an QA machine learning model that is trained based on example synthetic QA training datasets in accordance with some embodiments of the present disclosure, and the example synthetic QA training datasets comprise predicted label indicators and prediction explanation indicators that are associated with prediction score indicators that are (1) greater than two standard deviations from the mean of the prediction score indicators and (2) is among the top five ranked prediction score indicators.

While FIG. 14 provides example distribution filters in accordance with some embodiments of the present disclosure, it is noted that the scope of the present disclosure is not limited to the description above. In some examples, an example distribution filter may be determined through one or more other means.

As illustrated in the example shown in FIG. 14, a QA machine learning model that is trained in accordance with some embodiments of the present disclosure perform significantly better (in terms of F1 scores) than a QA machine learning model that is not trained based on various embodiments described herein. In some embodiments, training improvement thanks to inclusion of synthetic QA pairs may increase as more candidate label indicators are considered.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

VII. EXAMPLES

Example 1. A computer-implemented method comprising: generating, by one or more processors, one or more predicted label indicators associated with a textual dataset based on inputting the textual dataset to a dataset classification predicting machine learning model; generating, by the one or more processors, one or more prediction score indicators associated with one or more prediction explanation indicators based on inputting the textual dataset and the one or more predicted label indicators to a classification explanation predicting machine learning model; generating, by the one or more processors, one or more structured label-explanation datasets based on the one or more predicted label indicators, the one or more prediction explanation indicators, and the one or more prediction score indicators; generating, by the one or more processors, one or more synthetic QA training datasets based on the one or more structured label-explanation datasets and a prediction score threshold; generating, by the one or more processors, a prediction output using one or more QA machine learning models that are trained based on the synthetic QA training datasets; and initiating, by the one or more processors, the performance of one or more prediction-based operations based on the prediction output.

Example 2. The computer-implemented method of any of the preceding examples, wherein, when generating the one or more predicted label indicators, the computer-implemented method comprises: generating, by the one or more processors, one or more candidate label indicators associated with the textual dataset; inputting, by the one or more processors, the textual dataset and the one or more candidate label indicators to the dataset classification predicting machine learning model; and receiving, by the one or more processors, the one or more predicted label indicators from the dataset classification predicting machine learning model.

Example 3. The computer-implemented method of any of the preceding examples, wherein the one or more predicted label indicators comprise one or more binary classification label indicators.

Example 4. The computer-implemented method of any of the preceding examples, wherein the classification explanation predicting machine learning model comprises an extraction-based classification explanation predicting machine learning model.

Example 5. The computer-implemented method of any of the preceding examples, wherein the one or more prediction explanation indicators comprise one or more textual subsets associated with the textual dataset.

Example 6. The computer-implemented method of any of the preceding examples, wherein, when generating the one or more prediction score indicators, the computer-implemented method further comprises: inputting, by the one or more processors, the textual dataset, the one or more predicted label indicators, and the dataset classification predicting machine learning model to the extraction-based classification explanation predicting machine learning model; and receiving, by the one or more processors, the one or more prediction score indicators from the extraction-based classification explanation predicting machine learning model, wherein each of the one or more prediction score indicators is associated with one of the one or more prediction explanation indicators and is associated with one of the one or more predicted label indicators.

Example 7. The computer-implemented method of any of the preceding examples, wherein each of the one or more structured label-explanation datasets comprises a label-explanation matrix dataset that indicates data colorations between a predicted label indicator of the one or more predicted label indicators, a prediction explanation indicator of the one or more prediction explanation indicators, and a prediction score indicator of the one or more prediction score indicators.

Example 8. The computer-implemented method of any of the preceding examples, wherein the prediction score indicator indicates a predicted importance level associated with the prediction explanation indicator in generating the predicted label indicator for the textual dataset.

Example 9. The computer-implemented method of any of the preceding examples, further comprising: generating, by the one or more processors, the prediction score threshold based on the one or more prediction score indicators.

Example 10. The computer-implemented method of any of the preceding examples, wherein the prediction score threshold corresponds to a sample mean plus two standard deviations associated with the one or more prediction score indicators.

Example 11. The computer-implemented method of any of the preceding examples, further comprising: generating, by the one or more processors, a prediction score ranking based on the one or more prediction score indicators.

Example 12. The computer-implemented method of any of the preceding examples, wherein the one or more synthetic QA training datasets comprises one or more synthetic training question indicators associated with one or more synthetic training answer indicators, wherein the one or more synthetic training question indicators comprise at least one predicted label indicator of the one or more predicted label indicators, wherein the one or more synthetic training answer indicators comprises at least one prediction explanation indicator of the one or more prediction explanation indicators.

Example 13. The computer-implemented method of any of the preceding examples, wherein the at least one prediction explanation indicator is associated with at least one prediction score indicator that satisfies the prediction score threshold.

Example 14. The computer-implemented method of any of the preceding examples, wherein the at least one prediction score indicator indicates a predicted importance level associated with the at least one prediction explanation indicator in generating the at least one predicted label indicator for the textual dataset.

Example 15. The computer-implemented method of any of the preceding examples further comprising: generating, by the one or more processors, one or more human-annotated QA training datasets; generating, by the one or more processors, one or more mixed QA training datasets based on the one or more synthetic QA training datasets and the one or more human-annotated QA training datasets; and generating, by the one or more processors, the one or more trained QA machine learning models based on inputting the one or more mixed QA training datasets to the one or more untrained QA machine learning models for training.

Example 16. A computing apparatus comprising memory and one or more processors communicatively coupled to the memory, the one or more processors configured to: generate one or more predicted label indicators associated with a textual dataset based on inputting the textual dataset to a dataset classification predicting machine learning model; generate one or more prediction score indicators associated with one or more prediction explanation indicators based on inputting the textual dataset and the one or more predicted label indicators to a classification explanation predicting machine learning model; generate one or more structured label-explanation datasets based on the one or more predicted label indicators, the one or more prediction explanation indicators, and the one or more prediction score indicators; generate one or more synthetic QA training datasets based on the one or more structured label-explanation datasets and a prediction score threshold; generate a prediction output using one or more QA machine learning models that are trained based on the synthetic QA training datasets; and initiate the performance of one or more prediction-based operations based on the prediction output.

Example 17. The computing apparatus of any of the preceding examples, wherein, when generating the one or more predicted label indicators, the one or more processors are further configured to: generate one or more candidate label indicators associated with the textual dataset; input the textual dataset and the one or more candidate label indicators to the dataset classification predicting machine learning model; and receive the one or more predicted label indicators from the dataset classification predicting machine learning model.

Example 18. The computing apparatus of any of the preceding examples, wherein the one or more predicted label indicators comprise one or more binary classification label indicators.

Example 19. The computing apparatus of any of the preceding examples, wherein the classification explanation predicting machine learning model comprises an extraction-based classification explanation predicting machine learning model.

Example 20. The computing apparatus of any of the preceding examples, wherein the one or more prediction explanation indicators comprise one or more textual subsets associated with the textual dataset.

Example 21. The computing apparatus of any of the preceding examples, wherein, when generating the one or more prediction score indicators, the one or more processors are further configured to: input the textual dataset, the one or more predicted label indicators, and the dataset classification predicting machine learning model to the extraction-based classification explanation predicting machine learning model; and receive the one or more prediction score indicators from the extraction-based classification explanation predicting machine learning model, wherein each of the one or more prediction score indicators is associated with one of the one or more prediction explanation indicators and is associated with one of the one or more predicted label indicators.

Example 22. The computing apparatus of any of the preceding examples, wherein each of the one or more structured label-explanation datasets comprises a label-explanation matrix dataset that indicates data colorations between a predicted label indicator of the one or more predicted label indicators, a prediction explanation indicator of the one or more prediction explanation indicators, and a prediction score indicator of the one or more prediction score indicators.

Example 23. The computing apparatus of any of the preceding examples, wherein the prediction score indicator indicates a predicted importance level associated with the prediction explanation indicator in generating the predicted label indicator for the textual dataset.

Example 24. The computing apparatus of any of the preceding examples, wherein the one or more processors are further configured to: generate the prediction score threshold based on the one or more prediction score indicators.

Example 25. The computing apparatus of any of the preceding examples, wherein the prediction score threshold corresponds to a sample mean plus two standard deviations associated with the one or more prediction score indicators.

Example 26. The computing apparatus of any of the preceding examples, wherein the one or more processors are further configured to: generate a prediction score ranking based on the one or more prediction score indicators.

Example 27. The computing apparatus of any of the preceding examples, wherein the one or more synthetic QA training datasets comprises one or more synthetic training question indicators associated with one or more synthetic training answer indicators, wherein the one or more synthetic training question indicators comprise at least one predicted label indicator of the one or more predicted label indicators, wherein the one or more synthetic training answer indicators comprises at least one prediction explanation indicator of the one or more prediction explanation indicators.

Example 28. The computing apparatus of any of the preceding examples, wherein the at least one prediction explanation indicator is associated with at least one prediction score indicator that satisfies the prediction score threshold.

Example 29. The computing apparatus of any of the preceding examples, wherein the at least one prediction score indicator indicates a predicted importance level associated with the at least one prediction explanation indicator in generating the at least one predicted label indicator for the textual dataset.

Example 30. The computing apparatus of any of the preceding examples, wherein the one or more processors are further configured to: generate one or more human-annotated QA training datasets; generate one or more mixed QA training datasets based on the one or more synthetic QA training datasets and the one or more human-annotated QA training datasets; and generate the one or more trained QA machine learning models based on inputting the one or more mixed QA training datasets to the one or more untrained QA machine learning models for training.

Example 31. One or more non-transitory computer-readable storage media including instructions that, when executed by one or more processors, cause the one or more processors to: generate one or more predicted label indicators associated with a textual dataset based on inputting the textual dataset to a dataset classification predicting machine learning model; generate one or more prediction score indicators associated with one or more prediction explanation indicators based on inputting the textual dataset and the one or more predicted label indicators to a classification explanation predicting machine learning model; generate one or more structured label-explanation datasets based on the one or more predicted label indicators, the one or more prediction explanation indicators, and the one or more prediction score indicators; generate one or more synthetic QA training datasets based on the one or more structured label-explanation datasets and a prediction score threshold; generate a prediction output using one or more QA machine learning models that are trained based on the synthetic QA training datasets; and initiate the performance of one or more prediction-based operations based on the prediction output.

Example 32. The one or more non-transitory computer-readable storage media of any of the preceding examples, wherein, when generating the one or more predicted label indicators, the instructions further cause the one or more processors to: generate one or more candidate label indicators associated with the textual dataset; input the textual dataset and the one or more candidate label indicators to the dataset classification predicting machine learning model; and receive the one or more predicted label indicators from the dataset classification predicting machine learning model.

Example 33. The one or more non-transitory computer-readable storage media of any of the preceding examples, wherein the one or more predicted label indicators comprise one or more binary classification label indicators.

Example 34. The one or more non-transitory computer-readable storage media of any of the preceding examples, wherein the classification explanation predicting machine learning model comprises an extraction-based classification explanation predicting machine learning model.

Example 35. The one or more non-transitory computer-readable storage media of any of the preceding examples, wherein the one or more prediction explanation indicators comprise one or more textual subsets associated with the textual dataset.

Example 36. The one or more non-transitory computer-readable storage media of any of the preceding examples, wherein, when generating the one or more prediction score indicators, the instructions further cause the one or more processors to: input the textual dataset, the one or more predicted label indicators, and the dataset classification predicting machine learning model to the extraction-based classification explanation predicting machine learning model; and receive the one or more prediction score indicators from the extraction-based classification explanation predicting machine learning model, wherein each of the one or more prediction score indicators is associated with one of the one or more prediction explanation indicators and is associated with one of the one or more predicted label indicators.

Example 37. The one or more non-transitory computer-readable storage media of any of the preceding examples, wherein each of the one or more structured label-explanation datasets comprises a label-explanation matrix dataset that indicates data colorations between a predicted label indicator of the one or more predicted label indicators, a prediction explanation indicator of the one or more prediction explanation indicators, and a prediction score indicator of the one or more prediction score indicators.

Example 38. The one or more non-transitory computer-readable storage media of any of the preceding examples, wherein the prediction score indicator indicates a predicted importance level associated with the prediction explanation indicator in generating the predicted label indicator for the textual dataset.

Example 39. The one or more non-transitory computer-readable storage media of any of the preceding examples, wherein the instructions further cause the one or more processors to: generate the prediction score threshold based on the one or more prediction score indicators.

Example 40. The one or more non-transitory computer-readable storage media of any of the preceding examples, wherein the prediction score threshold corresponds to a sample mean plus two standard deviations associated with the one or more prediction score indicators.

Example 41. The one or more non-transitory computer-readable storage media of any of the preceding examples, wherein the instructions further cause the one or more processors to: generate a prediction score ranking based on the one or more prediction score indicators.

Example 42. The one or more non-transitory computer-readable storage media of any of the preceding examples, wherein the one or more synthetic QA training datasets comprises one or more synthetic training question indicators associated with one or more synthetic training answer indicators, wherein the one or more synthetic training question indicators comprise at least one predicted label indicator of the one or more predicted label indicators, wherein the one or more synthetic training answer indicators comprises at least one prediction explanation indicator of the one or more prediction explanation indicators.

Example 43. The one or more non-transitory computer-readable storage media of any of the preceding examples, wherein the at least one prediction explanation indicator is associated with at least one prediction score indicator that satisfies the prediction score threshold.

Example 44. The one or more non-transitory computer-readable storage media of any of the preceding examples, wherein the at least one prediction score indicator indicates a predicted importance level associated with the at least one prediction explanation indicator in generating the at least one predicted label indicator for the textual dataset.

Example 45. The one or more non-transitory computer-readable storage media of any of the preceding examples, wherein the instructions further cause the one or more processors to: generate one or more human-annotated QA training datasets; generate one or more mixed QA training datasets based on the one or more synthetic QA training datasets and the one or more human-annotated QA training datasets; and generate the one or more trained QA machine learning models based on inputting the one or more mixed QA training datasets to the one or more untrained QA machine learning models for training.

The invention claimed is:

1. A computer-implemented method comprising:
generating, by one or more processors, one or more predicted label indicators associated with a textual dataset based on inputting the textual dataset to a dataset classification predicting machine learning model;
generating, by the one or more processors, one or more prediction score indicators associated with one or more prediction explanation indicators based on inputting the textual dataset and the one or more predicted label indicators to a classification explanation predicting machine learning model;
generating, by the one or more processors, one or more structured label-explanation datasets based on the one or more predicted label indicators, the one or more prediction explanation indicators, and the one or more prediction score indicators;
generating, by the one or more processors, one or more synthetic question-answer (QA) training datasets based on the one or more structured label-explanation datasets and a prediction score threshold;
generating, by the one or more processors, a prediction output using one or more QA machine learning models that are trained based on the one or more synthetic QA training datasets; and
initiating, by the one or more processors, the performance of one or more prediction-based operations based on the prediction output.

2. The computer-implemented method of claim 1, wherein generating the one or more predicted label indicators comprises:
generating, by the one or more processors, one or more candidate label indicators associated with the textual dataset;
inputting, by the one or more processors, the textual dataset and the one or more candidate label indicators to the dataset classification predicting machine learning model; and
receiving, by the one or more processors, the one or more predicted label indicators from the dataset classification predicting machine learning model.

3. The computer-implemented method of claim 2, wherein the one or more predicted label indicators comprise one or more binary classification label indicators.

4. The computer-implemented method of claim 1, wherein the classification explanation predicting machine learning model comprises an extraction-based classification explanation predicting machine learning model.

5. The computer-implemented method of claim 4, wherein the one or more prediction explanation indicators comprise one or more textual subsets associated with the textual dataset.

6. The computer-implemented method of claim 4, wherein generating the one or more prediction score indicators comprises:
inputting, by the one or more processors, the textual dataset, the one or more predicted label indicators, and the dataset classification predicting machine learning model to the extraction-based classification explanation predicting machine learning model; and
receiving, by the one or more processors, the one or more prediction score indicators from the extraction-based classification explanation predicting machine learning model, wherein each of the one or more prediction score indicators is associated with one of the one or more prediction explanation indicators and is associated with one of the one or more predicted label indicators.

7. The computer-implemented method of claim 1, wherein each of the one or more structured label-explanation datasets comprises a label-explanation matrix dataset that indicates data colorations between a predicted label indicator of the one or more predicted label indicators, a prediction explanation indicator of the one or more prediction explanation indicators, and a prediction score indicator of the one or more prediction score indicators.

8. A system comprising memory and one or more processors communicatively coupled to the memory, the one or more processors configured to:
generate one or more predicted label indicators associated with a textual dataset based on inputting the textual dataset to a dataset classification predicting machine learning model;
generate one or more prediction score indicators associated with one or more prediction explanation indicators based on inputting the textual dataset and the one or more predicted label indicators to a classification explanation predicting machine learning model;
generate one or more structured label-explanation datasets based on the one or more predicted label indicators, the one or more prediction explanation indicators, and the one or more prediction score indicators;

generate one or more synthetic question-answer (QA) training datasets based on the one or more structured label-explanation datasets and a prediction score threshold;

generate a prediction output using one or more QA machine learning models that are trained based on the one or more synthetic QA training datasets; and initiate the performance of one or more prediction-based operations based on the prediction output.

9. The system of claim 8, wherein to generate the one or more predicted label indicators, the one or more processors are further configured to:

generate one or more candidate label indicators associated with the textual dataset;

input the textual dataset and the one or more candidate label indicators to the dataset classification predicting machine learning model; and receive the one or more predicted label indicators from the dataset classification predicting machine learning model.

10. The system of claim 9, wherein the one or more predicted label indicators comprise one or more binary classification label indicators.

11. The system of claim 8, wherein the classification explanation predicting machine learning model comprises an extraction-based classification explanation predicting machine learning model.

12. The system of claim 11, wherein the one or more prediction explanation indicators comprise one or more textual subsets associated with the textual dataset.

13. The system of claim 11, wherein to generate the one or more prediction score indicators, the one or more processors are further configured to:

input the textual dataset, the one or more predicted label indicators, and the dataset classification predicting machine learning model to the extraction-based classification explanation predicting machine learning model; and receive the one or more prediction score indicators from the extraction-based classification explanation predicting machine learning model, wherein each of the one or more prediction score indicators is associated with one of the one or more prediction explanation indicators and is associated with one of the one or more predicted label indicators.

14. The system of claim 8, wherein each of the one or more structured label-explanation datasets comprises a label-explanation matrix dataset that indicates data colorations between a predicted label indicator of the one or more predicted label indicators, a prediction explanation indicator of the one or more prediction explanation indicators, and a prediction score indicator of the one or more prediction score indicators.

15. One or more non-transitory computer-readable storage media including instructions that, when executed by one or more processors, cause the one or more processors to:

generate one or more predicted label indicators associated with a textual dataset based on inputting the textual dataset to a dataset classification predicting machine learning model;

generate one or more prediction score indicators associated with one or more prediction explanation indicators based on inputting the textual dataset and the one or more predicted label indicators to a classification explanation predicting machine learning model;

generate one or more structured label-explanation datasets based on the one or more predicted label indicators, the one or more prediction explanation indicators, and the one or more prediction score indicators;

generate one or more synthetic question-answer (QA) training datasets based on the one or more structured label-explanation datasets and a prediction score threshold;

generate a prediction output using one or more QA machine learning models that are trained based on the one or more synthetic QA training datasets; and initiate the performance of one or more prediction-based operations based on the prediction output.

16. The one or more non-transitory computer-readable storage media of claim 15, wherein to generate the one or more predicted label indicators, the instructions further cause the one or more processors to:

generate one or more candidate label indicators associated with the textual dataset;

input the textual dataset and the one or more candidate label indicators to the dataset classification predicting machine learning model; and receive the one or more predicted label indicators from the dataset classification predicting machine learning model.

17. The one or more non-transitory computer-readable storage media of claim 16, wherein the one or more predicted label indicators comprise one or more binary classification label indicators.

18. The one or more non-transitory computer-readable storage media of claim 15, wherein the classification explanation predicting machine learning model comprises an extraction-based classification explanation predicting machine learning model.

19. The one or more non-transitory computer-readable storage media of claim 18, wherein the one or more prediction explanation indicators comprise one or more textual subsets associated with the textual dataset.

20. The one or more non-transitory computer-readable storage media of claim 18, wherein to generate the one or more prediction score indicators, the instructions further cause the one or more processors to:

input the textual dataset, the one or more predicted label indicators, and the dataset classification predicting machine learning model to the extraction-based classification explanation predicting machine learning model; and receive the one or more prediction score indicators from the extraction-based classification explanation predicting machine learning model, wherein each of the one or more prediction score indicators is associated with one of the one or more prediction explanation indicators and is associated with one of the one or more predicted label indicators.

* * * * *